United States Patent
Yanagawa

(10) Patent No.: US 10,852,970 B2
(45) Date of Patent: Dec. 1, 2020

(54) STORAGE CONTROL APPARATUS, CONTROL METHOD THEREOF, STORAGE MEDIUM, AND INFORMATION PROCESSING APPARATUS

(71) Applicant: CANON KABUSHIKI KAISHA, Tokyo (JP)

(72) Inventor: Katsuhiko Yanagawa, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/140,758

(22) Filed: Sep. 25, 2018

(65) Prior Publication Data
US 2019/0095118 A1   Mar. 28, 2019

(30) Foreign Application Priority Data
Sep. 26, 2017   (JP) ................................. 2017-185317

(51) Int. Cl.
G06F 3/06 (2006.01)
G06F 13/18 (2006.01)
G06F 11/20 (2006.01)

(52) U.S. Cl.
CPC .......... G06F 3/0634 (2013.01); G06F 3/0611 (2013.01); G06F 3/0617 (2013.01); G06F 3/0656 (2013.01); G06F 3/0659 (2013.01); G06F 3/0685 (2013.01); G06F 3/0689 (2013.01); G06F 11/2056 (2013.01); G06F 13/18 (2013.01)

(58) Field of Classification Search
CPC ............................. G06F 3/0634; G06F 3/0685
See application file for complete search history.

(56) References Cited

U.S. PATENT DOCUMENTS

| 8,046,548 | B1* | 10/2011 | Chatterjee | G06F 11/2064 707/655 |
| 2004/0236983 | A1* | 11/2004 | Burton | G06F 11/2058 714/6.23 |
| 2014/0129765 | A1* | 5/2014 | Cho | G06F 11/1441 711/105 |
| 2015/0331637 | A1* | 11/2015 | Aguilar | G06F 3/0659 711/103 |
| 2016/0231938 | A1 | 8/2016 | Niwa | |
| 2017/0116097 | A1* | 4/2017 | Keremane | G06F 11/0727 |

FOREIGN PATENT DOCUMENTS

JP   2016146087 A   8/2016

OTHER PUBLICATIONS

"Non-Volatile Random Access Memory (NVRAM)", Nov. 5, 2012 (Year: 2012).*
"Non-volatile RAM technology", accessed Apr. 1, 2020. (Year: 2020).*

* cited by examiner

Primary Examiner — Edward J Dudek, Jr.
(74) Attorney, Agent, or Firm — Venable LLP

(57) ABSTRACT

A storage control apparatus can be connected to a higher level apparatus and a plurality of storage devices, and receives, from the higher level apparatus, a request to write into one of the plurality of storage devices. Here, if a storage device, among the plurality of storage devices, that has been specified as the access destination for the write request is not yet active, the storage control apparatus suspends the data involved in the write request, and writes the suspended data involved in the write request into the storage device once the storage device specified as the access destination is in a ready state.

15 Claims, 23 Drawing Sheets

FIG. 21

| | 803 | 802 | 801 | 2101 |
|---|---|---|---|---|
| | VALID/INVALID | DATA SIZE_0 | WRITE ADDRESS_0 | TEMPORARY ADDRESS_0 |
| | VALID/INVALID | DATA SIZE_1 | WRITE ADDRESS_1 | TEMPORARY ADDRESS_1 |
| | VALID/INVALID | DATA SIZE_2 | WRITE ADDRESS_2 | TEMPORARY ADDRESS_2 |
| | VALID/INVALID | DATA SIZE_3 | WRITE ADDRESS_3 | TEMPORARY ADDRESS_3 |
| | .. | .. | .. | .. |
| | VALID/INVALID | DATA SIZE_n | WRITE ADDRESS_n | TEMPORARY ADDRESS_n |

220

STORAGE CONTROL APPARATUS, CONTROL METHOD THEREOF, STORAGE MEDIUM, AND INFORMATION PROCESSING APPARATUS

BACKGROUND OF THE INVENTION

Field of the Invention

The invention relates to a storage control apparatus, a control method thereof, a storage medium, and an information processing apparatus.

Description of the Related Art

Some storage control apparatuses carry out mirroring (RAID 1), in which identical data is stored in a plurality of storage devices (e.g., hard disk drives; abbreviated as "HDD" hereinafter), in order to protect the data stored in the storage devices. A storage control apparatus carrying out such mirroring is connected to a host, which is a higher level apparatus, and acts as a storage device from the standpoint of the host.

An HDD is a storage device that records and reads out information by moving a magnetic head while rotating, at high speeds, a disk to which a magnetic material is applied. However, after powering the device on, it takes a long time for the disk to reach a prescribed rotation speed so that data can be read and written (called "spin-up time").

On the other hand, Solid State Drives (SSDs), which contain flash memory, which is a type of semiconductor storage device, have recently become widespread. Compared to HDDs, SSDs have the following characteristics.

No spin-up is required, and thus the startup time is short.
Data can be read and written quickly.
The same amount of storage space is more expensive.

Thus although a high-speed information processing apparatus can be constructed by using nothing but SSDs for the storage devices used in mirroring, doing so is extremely expensive. It is therefore conceivable to carry out mirroring using different devices, i.e., a high-speed SSD and an inexpensive HDD.

However, even if an SSD having a short startup time is used, conventional storage control apparatuses wait until all connected storage devices have started up and then notify the host that startup is complete in order to store the same data in a plurality of storage devices. To reduce such standby time until startup is complete, Japanese Patent Laid-Open No. 2016-146087 proposes notifying a host that startup is complete upon the startup of only one storage device being complete, under the assumption that read operations in mirroring are completed by only one storage device.

However, this conventional technique has the following issue. For example, the above-described conventional technique applies only to read operations, and does not apply to write operations. Thus with the above-described conventional technique, it is necessary to wait for all storage devices to start up if a write request is issued from the host. Thus the issue that the processing of the host will be held up remains unsolved.

SUMMARY OF THE INVENTION

The invention enables realization of a system that favorably handles a situation where, when a plurality of storage devices are controlled in tandem, a storage device in the process of starting up is accessed by a higher level apparatus.

One aspect of the invention provides a storage control apparatus that can be connected to a higher level apparatus and a plurality of storage devices, the storage control apparatus comprising: a receiving unit that receives, from the higher level apparatus, a write request to any one of the plurality of storage devices; a suspending unit that suspends data corresponding to the write request in a case where a storage device, among the plurality of storage devices, that is specified as an access destination of the write request is not yet active; and a writing unit that, once the storage device specified as the access destination enters a ready state, writes the data corresponding to the write request suspended by the suspending unit into the storage device.

Another aspect of the invention provides an information processing apparatus comprising: a higher level apparatus; a plurality of storage devices; and the storage control apparatus.

Still another aspect of the invention provides a control method of a storage control apparatus that can be connected to a higher level apparatus and a plurality of storage devices, the method comprising: receiving, from the higher level apparatus, a write request to any one of the plurality of storage devices; suspending data corresponding to the write request in a case where a storage device, among the plurality of storage devices, that is specified as an access destination of the write request is not yet active; and writing, once the storage device specified as the access destination enters a ready state, the suspending data corresponding to the write request into the storage device.

Yet another aspect of the invention provides a computer-readable storage medium storing a computer program for causing a computer to execute a control method of a storage control apparatus that can be connected to a higher level apparatus and a plurality of storage devices, the method comprising: receiving, from the higher level apparatus, a write request to any one of the plurality of storage devices; suspending data corresponding to the write request in a case where a storage device, among the plurality of storage devices, that is specified as an access destination of the write request is not yet active; and writing, once the storage device specified as the access destination enters a ready state, the suspending data corresponding to the write request into the storage device.

Further features of the present invention will become apparent from the following description of exemplary embodiments (with reference to the attached drawings).

BRIEF DESCRIPTION OF THE DRAWINGS

FIG. 21 is a schematic diagram illustrating the configuration of the write suspension register according to an embodiment.

DESCRIPTION OF THE EMBODIMENTS

Preferred embodiments of the invention will now be described in detail with reference to the drawings. It should be noted that the relative arrangement of the components, the numerical expressions and numerical values set forth in these embodiments do not limit the scope of the invention unless it is specifically stated otherwise.

First Embodiment

Configuration of Printing System

Figure 1:
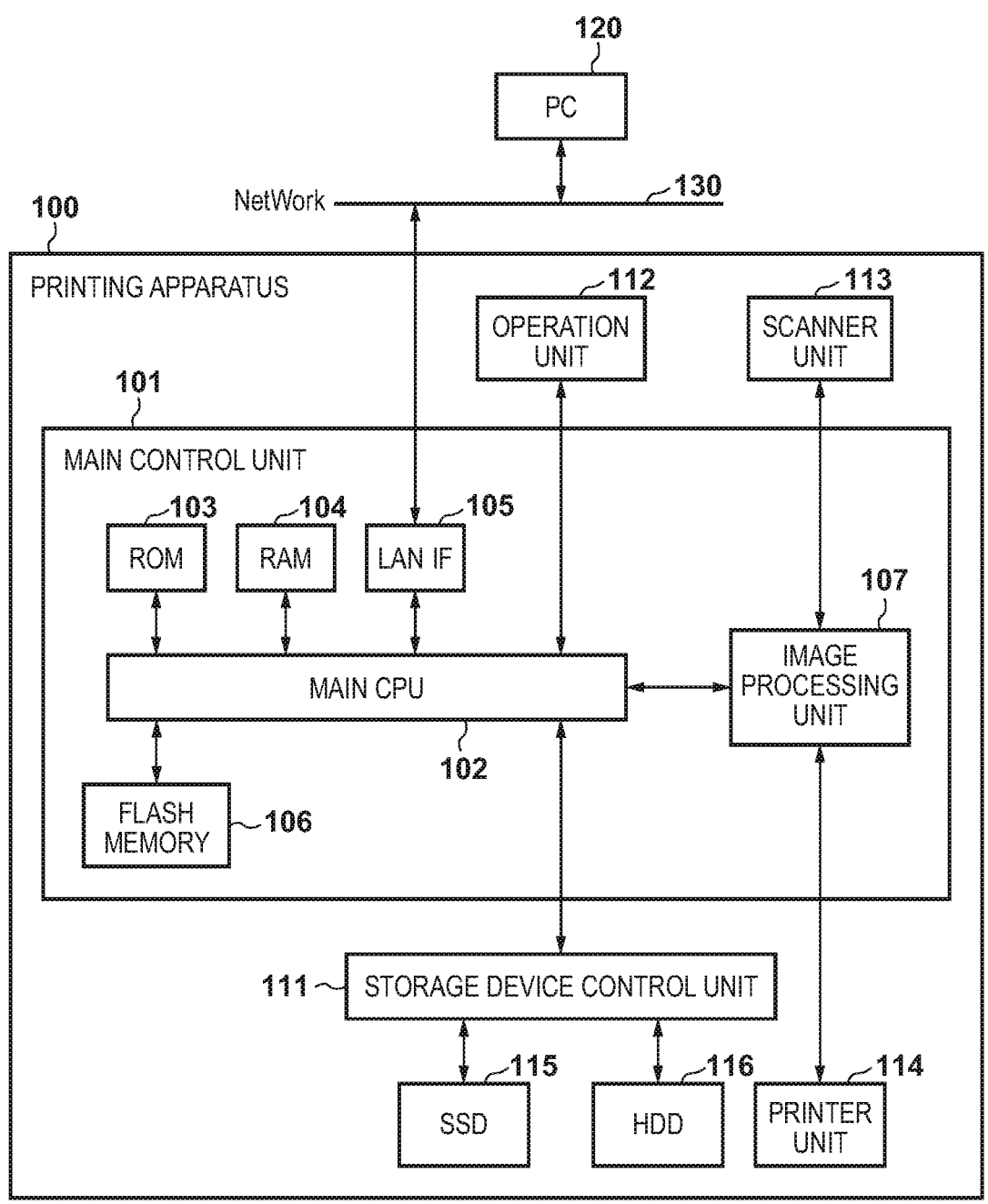
FIG. 1 is a schematic diagram illustrating the configuration of a printing system according to an embodiment.

A first embodiment of the invention will be described below. First, an example of the configuration of a printing system according to this embodiment will be described with reference to FIG. 1. This printing system is constituted by a printing apparatus 100, which is an example of an information processing apparatus, and a personal computer (abbreviated as "PC" hereinafter) 120, which can be connected over a network 130 such as a local area network (LAN). The printing apparatus 100 is configured including a main control unit 101, a storage device control unit 111, an operation unit 112, a scanner unit 113, a printer unit 114, an SSD 115, and an HDD 116. The main control unit 101 includes a main CPU 102, ROM 103, RAM 104, a LAN-IF (interface) 105, flash memory 106, and an image processing unit 107.

The main CPU 102 realizes control of the various units, various types of computational processes, and so on by loading programs stored in the ROM 103 into the RAM 104 and executing those programs. The ROM 103 is non-volatile memory, and stores a Basic Input/Output System (BIOS) program, control parameters, and so on. On-board rewrites are possible if flash memory is connected. The RAM 104 is volatile memory such as DRAM, and is used as a work region for programs, as a region for storing print data, and so on.

The LAN-IF 105 is an interface with the LAN 130 that can be connected to the printing apparatus 100, and is typically compliant with the TCP/IP protocol. A networkable device such as an external personal computer 120 can be connected by a network cable, and printing processes can be carried out over the network. Connections to the Internet can also be made via a router.

A boot program, various types of application programs, various types of parameters, and so on are stored in the flash memory 106. The image processing unit 107 executes various types of image processes on image data obtained from the LAN-IF 105 or the scanner unit 113. A liquid crystal screen display, buttons, or the like on an operation panel (not shown) are provided in the operation unit 112, and various types of settings can be made, statuses can be confirmed, and so on for the printing apparatus 100 by operating those elements. The scanner unit 113 uses a reading device such as a CCD to read images as digital data. The printer unit 114 is constituted by a print engine, a paper feed system, and a paper discharge system (not shown), and prints image data processed by the image processing unit 107 onto paper or the like.

The SSD 115 and the HDD 116 are used as temporary work regions for configuration parameters of application programs and printing processes, and as storage locations for user data. The storage device control unit 111 is located between the main CPU 102 in the main control unit 101, and the SSD 115 and the HDD 116, and is connected to those devices by interfaces compliant with the Serial Advanced Technology Attachment (SATA) standard. In addition to a function for controlling storage devices such as the SSD 115 and the HDD 116, the storage device control unit 111 has a mirroring function for storing identical data in both the SSD 115 and the HDD 116. In other words, write data from the main CPU 102, which serves as a host, is written into both the SSD 115 and the HDD 116. On the other hand, in response to a read request from the host, data is read out from either the SSD 115 or the HDD 116 and transferred to the main CPU 102.

Here, the storage device control unit 111, the SSD 115, and the HDD 116 are configured as external devices connected to the main control unit 101. However, the invention is not limited thereto, and the storage device control unit 111, the SSD 115, and the HDD 116 may be configured as elements incorporated into the main control unit 101, for example.

Configuration of Storage Device Control Unit

Figure 2:
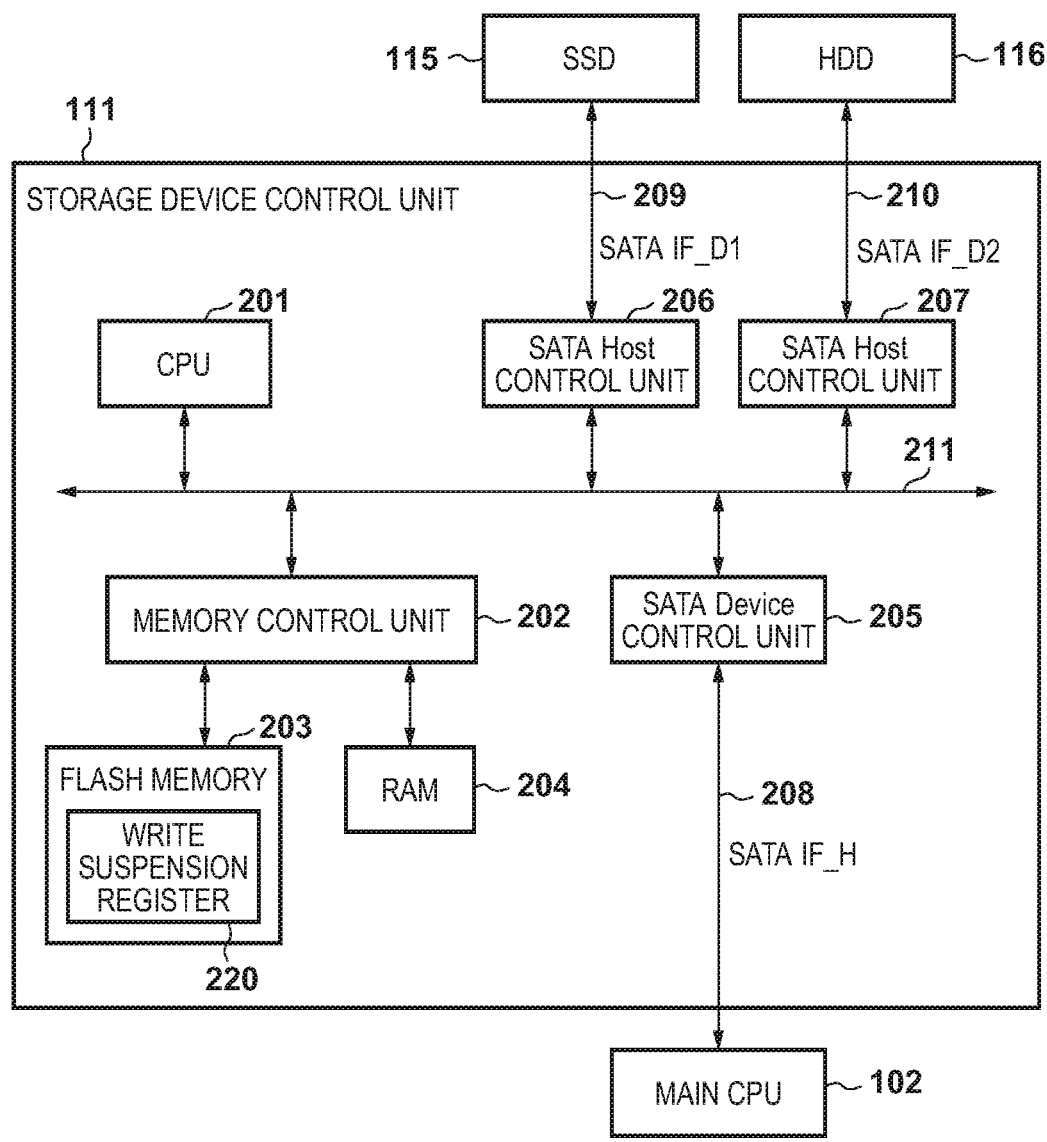
FIG. 2 is a block diagram illustrating the internal configuration of a storage device control unit 111 according to an embodiment.

An example of the internal configuration of the storage device control unit 111 according to this embodiment will be described next with reference to FIG. 2. The storage device control unit 111 includes a CPU 201, a memory control unit 202, flash memory 203, RAM 204, a SATA-device control unit 205, SATA-host control units 206 and 207, a SATA-IF_H 208, and SATA-IF_Ds 209 and 210. These units are connected by a system bus 211.

The CPU 201 carries out system control, various types of computational processes, and so on. The memory control unit 202 carries out input/output control, DMA control, and so on for the various types of memory devices. The flash memory 203 is rewritable non-volatile memory, and stores control programs, encryption/decryption programs, control parameters, and so on. A write suspension register 220 is provided in the flash memory 203. The write suspension register is a register for holding write information in the case where a write cannot be made into storage, and is configured as illustrated in FIG. 8.

Figure 8:
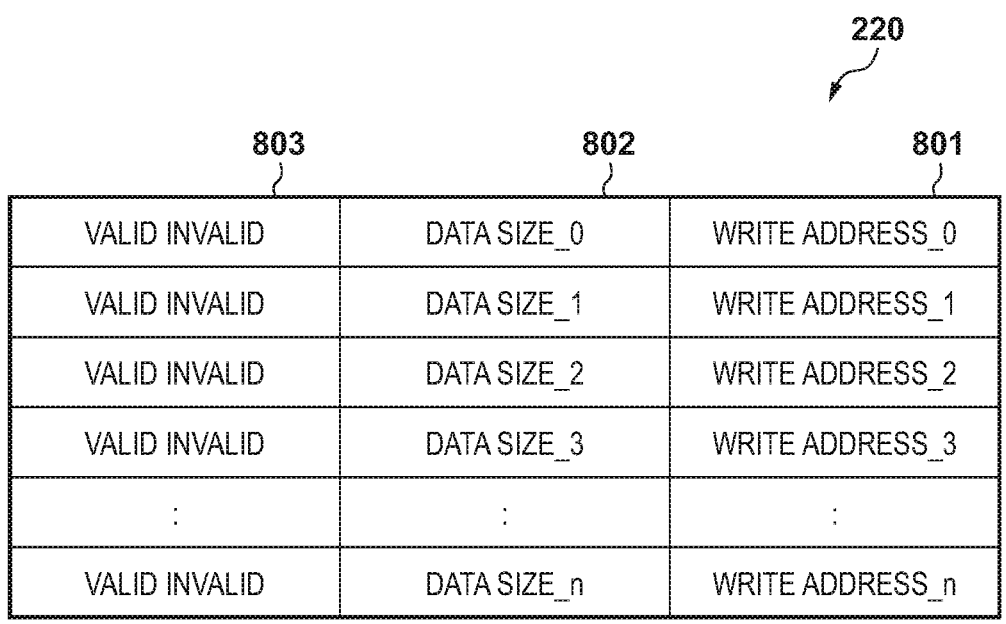
FIG. 8 is a schematic diagram illustrating the configuration of a write suspension register according to an embodiment.

As illustrated in FIG. 8, the write suspension register 220 is configured including regions for storing a write address 801, a data size 802, and a valid bit 803 indicating whether or not the write information is valid. The valid bit 803 has a value of "1" to indicate "valid", i.e., a state in which write access is suspended, and the value of "0" to indicate "invalid", i.e., that a suspended write access has been executed. In other words, the valid bit 803 being "1" indicates that a write command has been suspended. Although this embodiment describes an example in which the write suspension register 220 is provided within the flash memory 203 of the storage device control unit 111, the invention is not intended to be limited thereto. For example, the write suspension register 220 may be provided in a storage device, e.g., the SSD 115, where data corresponding to the write request is suspended (held). This makes it possible to reduce the size of the flash memory 203 in the storage device control unit 111.

The descriptions will now return to FIG. 2. The RAM 204 is volatile memory that is rewritable and capable of high speed access, and is used to load parts of programs stored in the flash memory 203 and as a work region for those programs, as a data buffer region, and so on. The SATA-device control unit 205 is connected to the main CPU 102 (called "host" hereinafter) within the main control unit 101, which serves as a SATA-host, via the SATA-IF_H 208, which is an interface compliant with the SATA standard. The SATA-device control unit 205 carries out processes for controlling data input/output requests from the host.

The SATA-host control unit 206 is connected to the SSD 115, which is a SATA-device, via the SATA-IF_D 209, which is an interface compliant with the SATA standard, and controls the input/output of data to/from the SSD 115. The SATA-host control unit 207 is connected to the HDD 116, which is a SATA-device, via the SATA-IF_D 210, which is an interface compliant with the SATA standard, and controls the input/output of data to/from the HDD 116. In other words, the storage device control unit 111 functions as a SATA-SATA bridge device for data input/output requests from the main CPU 102, which serves as the "host", to the SSD 115 and the HDD 116, which serve as "devices". The system bus 211 collectively represents a control bus, a data bus, and local buses between given blocks, for the sake of simplicity.

Sequence for Returning from Power Saving Mode

Figure 3:
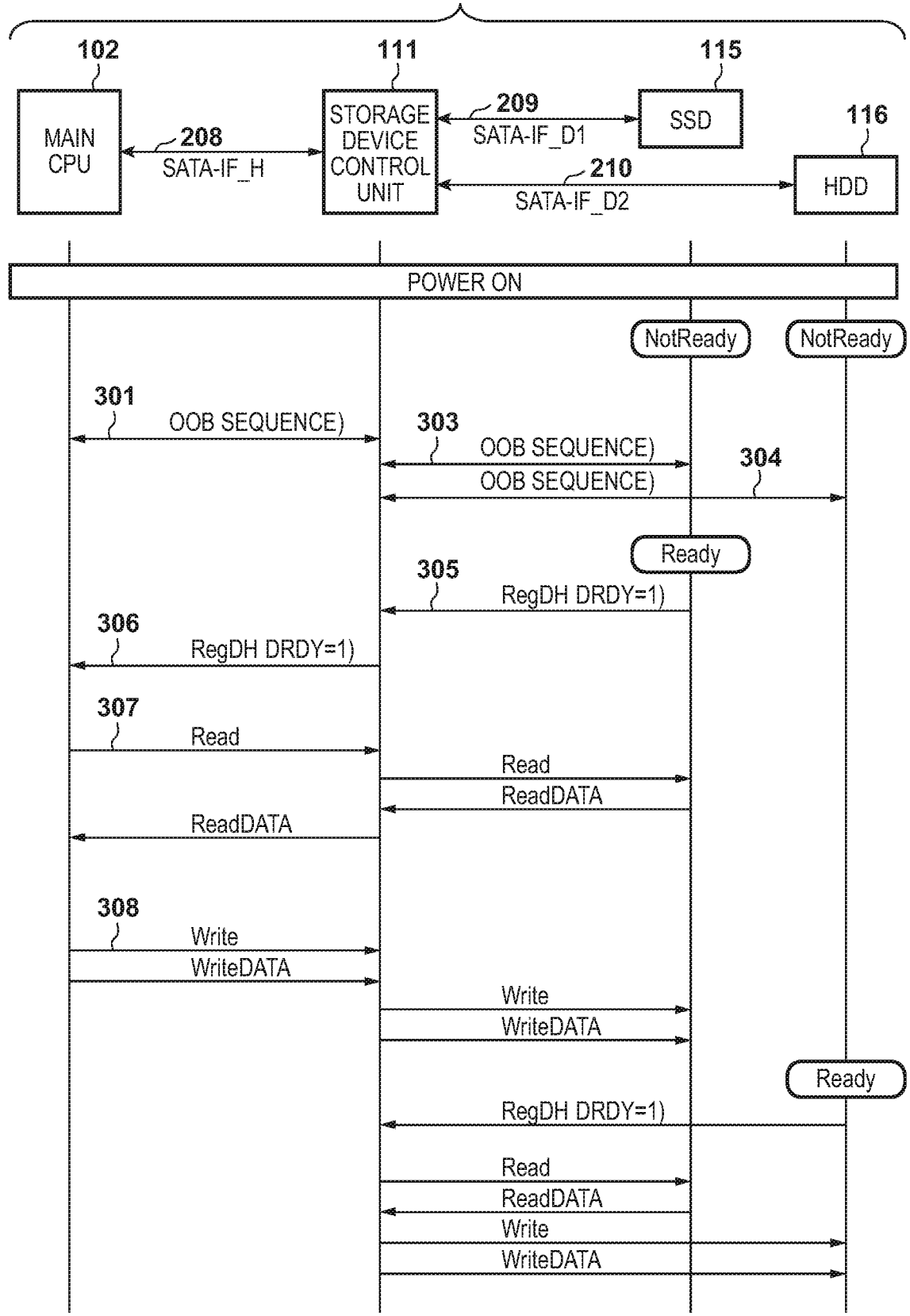
FIG. 3 is a sequence chart illustrating startup according to an embodiment.

A sequence for returning from a power saving mode to a normal mode according to this embodiment will be described next with reference to FIG. 3. The "sequence" referred to here expresses the return sequence between the main CPU 102, the storage device control unit 111, the SSD 115, and the HDD 116 in time series. According to the SATA standard, it is first necessary to establish communication links between the respective IFs through prescribed sequence processing when the power source is turned on. The following describes, in time series, a process leading up to the links being established.

First, after the printing apparatus 100 has been turned on, specific commands (COMRESET, COMINIT, and COM-WAKE) are sent between the main CPU 102 and the storage device control unit 111 in what is called an Out Of Band (OOB) sequence 301. A communication link is established between the main CPU 102 and the storage device control unit 111 through this OOB sequence 301. Likewise, an OOB sequence 303 is carried out between the storage device control unit 111 and the SSD 115 to establish a communication link. Furthermore, an OOB sequence 304 is carried out between the storage device control unit 111 and the HDD 116 to establish a communication link.

Once able to respond to commands from the host (the main CPU 102), the SSD 115 sets a Device Ready (DRDY) bit (sets "1"). The SSD 115 then sends, to the storage device control unit 111, a Register Device to Host (RegDH) 305 in which DRDY is set. Next, upon receiving the RegDH, the storage device control unit 111 sends a RegDH 306, in which the DRDY bit is set, to the main CPU 102.

On the other hand, the HDD 116 takes several seconds to several tens of seconds to rotate the disk to a prescribed rotation speed, and thus does not immediately enter a ready state. However, according to this embodiment, the main CPU 102 has received the RegDH (DRDY=1) from the storage device control unit 111, and thus data access such as read 307 and write 308 can be carried out without waiting for the HDD 116 to be in a RegDH (DRDY=1) state. Then, once the RegDH (DRDY=1) has been received from the HDD 116, recovery is carried out for the writes made up until that point, the data is made consistent, and a mirroring state is achieved as a result. Specific operations of the storage device control unit 111 that carries out this operation will be described below.

Processing Sequence of Storage Device Control Unit

Figure 4:
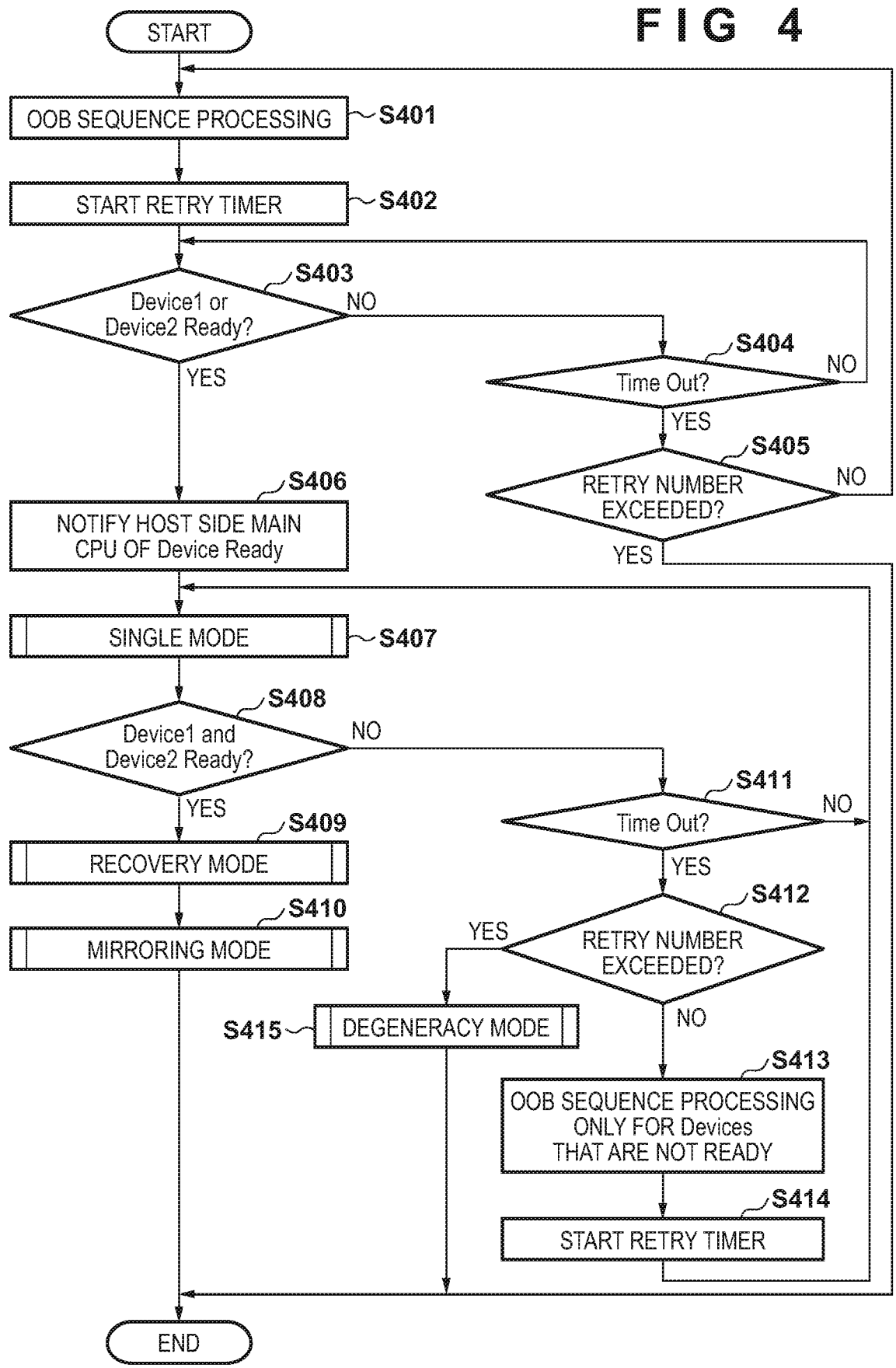
FIG. 4 is a flowchart illustrating operations performed by the storage device control unit according to an embodiment.

Next, a processing sequence for operations of the storage device control unit 111 will be described with reference to FIG. 4. The processing described below is realized, for example, by the CPU 201 loading programs stored in the flash memory 203 or the like into the RAM 204 and executing those programs.

First, in S401, the CPU 201 establishes communication links by carrying out the OOB sequence processing with the main CPU 102, the SSD 115, and the HDD 116. Next, in S402, the CPU 201 starts a retry timer to stand by for a notification of RegDH (DRDY=1) from the SSD 115 or the HDD 116 and retrying if the notification is not received after a set amount of time has passed. In S403, the CPU 201 determines whether or not a notification of RegDH (DRDY=1) has been received from the SSD 115 or the HDD 116.

If in S403 it is determined that a notification of RegDH (DRDY=1), which indicates access permission (Device Ready), has been received from the SSD 115 or the HDD 116 (Yes), the process moves to S406, where the CPU 201 notifies the main CPU 102 on the host side of the RegDH (DRDY=1). Then, in S407, the CPU 201 moves to the subroutine of a single mode. The "single mode" in subroutine S407 will be described later.

On the other hand, if in S403 no notification of the RegDH (DRDY=1) has been received from the SSD 115 or the HDD 116 (No), the process moves to S404, where the CPU 201 checks the retry timer and determines whether or not the time required for a retry has passed. If in S404 it is determined that the time required for a retry has not passed (No), the process returns to S403. On the other hand, if it is determined that the time required for a retry has passed (Yes), the process moves to S405.

In S405, the CPU 201 checks a retry number and determines whether or not the retry number exceeds a prescribed number. If in S405 the retry number does not exceed the prescribed number (No), the CPU 201 returns the process to S401 and carries out the OOB sequence processing again. On the other hand, if in S405 the retry number exceeds the prescribed number (Yes), the CPU 201 determines that an error has occurred, and terminates the process.

After S407, the process moves to S408, where the CPU 201 stands by for the notification of the RegDH (DRDY=1) from the storage device from which a notification was not received in S403, and then determines whether or not the notification of RegDH (DRDY=1) has been received from all storage devices. If in S408 a notification of the RegDH (DRDY=1) has not been received from all storage devices (No), the process moves to S411, where the CPU 201 checks the retry timer and determines whether or not the time required for a retry has passed. If in S411 it is determined that the time required for a retry has not passed (No), the process returns to S407, whereas if it is determined that the time required for a retry has passed (Yes), the process moves to S412.

In S412, the CPU 201 checks a retry number and determines whether or not the retry number exceeds a prescribed number. If in S412 the retry number does not exceed the prescribed number (No), the process moves to S413, where the CPU 201 carries out the OOB sequence processing for a device not in the ready state. On the other hand, if in S412 the retry number exceeds the prescribed number (Yes), it is conceivable that one of the storage devices has malfunctioned or the like, and thus the process moves to S415, which is a degeneracy mode subroutine. The "degeneracy mode" in subroutine S415 will be described later.

On the other hand, if in S408 a notification of the RegDH (DRDY=1) has been received from all storage devices (Yes), the process moves to a recovery mode subroutine S409. The "recovery mode" in subroutine S409 will be described later. After S409, the process moves to a mirroring mode subroutine S410. The "mirroring mode" in subroutine S410 will be described later.

Single Mode

Figure 5:
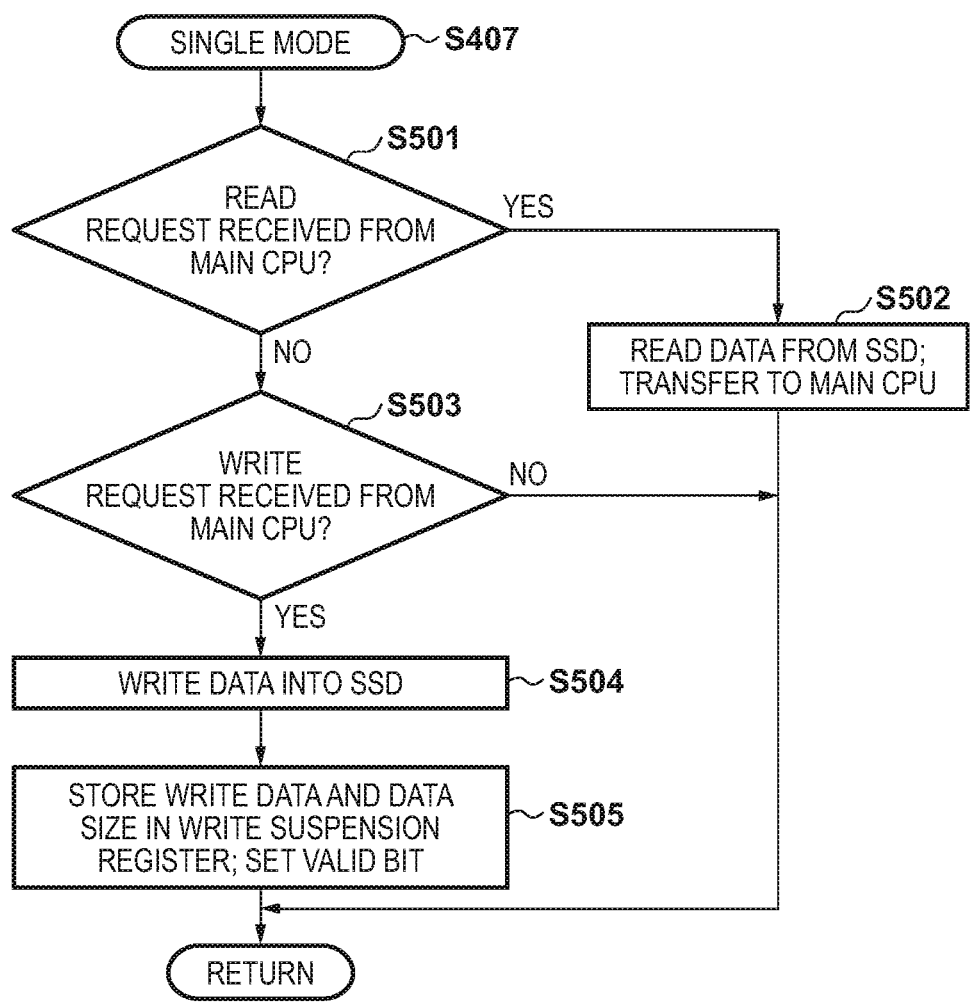
FIG. 5 is a flowchart illustrating operations in a single mode according to an embodiment.

A processing sequence in the "single mode" in the aforementioned subroutine S407 will be described next with reference to FIG. 5. The processing described below is realized, for example, by the CPU 201 loading programs stored in the flash memory 203 or the like into the RAM 204 and executing those programs. Here, "single mode" refers to a mode of operations where either the SSD 115 or the HDD 116 is active.

First, in S501, the CPU 201 determines whether or not a read request has been received from the host-side main CPU 102. If in S501 a read request has been received from the main CPU 102 (Yes), the process moves to S502, where the CPU 201 makes a read access to the storage device from which a notification of the RegDH (DRDY=1) has been received (the SSD 115, in these descriptions). Furthermore, the CPU 201 transfers the read data to the host-side main CPU 102. The process then returns to the main routine.

On the other hand, if in S501 no read request has been received from the main CPU 102 (No), the process moves to S503, where the CPU 201 determines whether or not a write request has been received from the main CPU 102. If in S503 a write request has been received from the main CPU 102 (Yes), the process moves to S504, where the CPU 201 makes a write access to the SSD 115 from which a notification of the RegDH (DRDY=1) has been received. This state is a state of operating in the single mode, where the SSD 115 is in the ready state but the HDD 116 is not yet active. Thus even if the write request specifies the HDD 116, the data corresponding to the write request is suspended by being written into the SSD 115, which is in the ready state. Next, in S505, the CPU 201 searches the write suspension register 220 in the flash memory 203 for an entry where the valid bit 803 is clear, i.e., "0", writes a write address and a data size into that entry as suspension information, and sets the valid bit 803 to "1". On the other hand, if in S503 no write request has been received from the main CPU 102 (No), the process ends and returns to the main routine.

Recovery Mode

Figure 6:
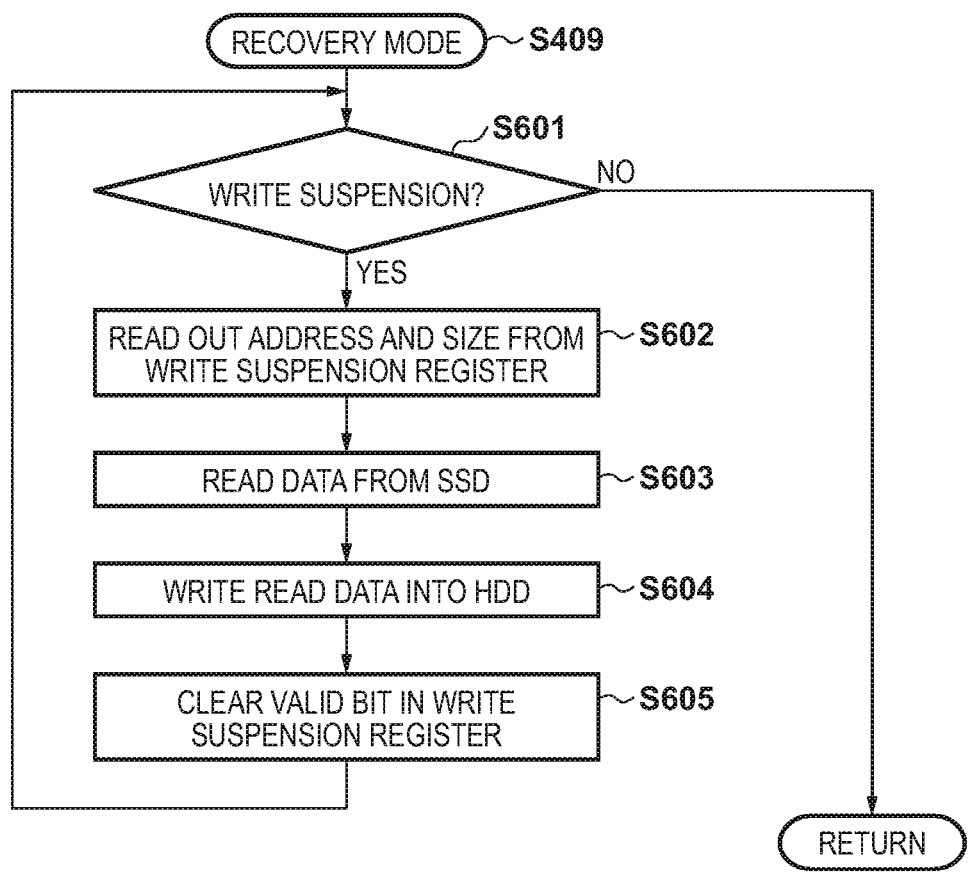
FIG. 6 is a flowchart illustrating operations in a recovery mode according to an embodiment.

Next, operations in the "recovery mode" of the aforementioned subroutine S409 will be described with reference to the flowchart in FIG. 6. The processing described below is realized, for example, by the CPU 201 loading programs stored in the flash memory 203 or the like into the RAM 204 and executing those programs. Here, "recovery mode" is a mode in which, when suspension data for the write request is held in the SSD 115, for example, in the single mode, a write access is made to the HDD 116, which is the other storage device, using the stated suspension data after the HDD 116 has started up.

First, in S601, the CPU 201 determines whether or not there is an entry, in the write suspension register 220 in the flash memory 203, where the valid bit 803 is set to "1". In other words, it is determined whether or not there is a write suspension. If there is no entry where the valid bit 803 is set to "1" (No), the process ends and returns to the main routine.

On the other hand, if there is an entry where the valid bit 803 is set to "1" (Yes), the process moves to S602, where the CPU 201 reads out the write address 801 and the data size 802 in that entry. Next, in S603, the CPU 201 reads (obtains) the data from the SSD 115 on the basis of the read-out write address information and data size information.

Next, in S604, the CPU 201 functions as a writing unit, and writes the read data into the HDD 116. Once the write is complete, the process moves to S605, where the CPU 201 clears the valid bit in the entry read out in S602 to "0" and returns the process to S601.

Mirroring Mode

Figure 7:
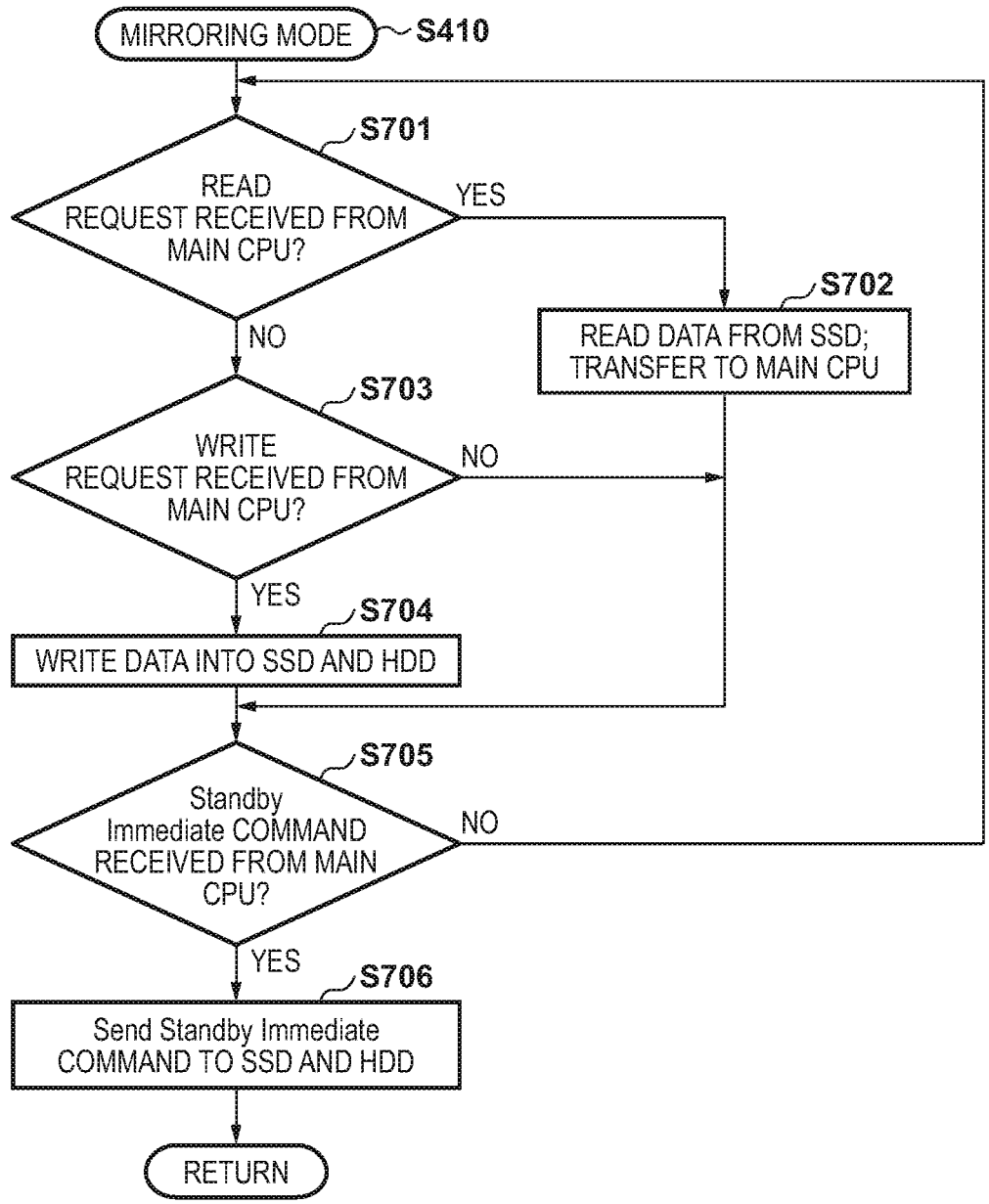
FIG. 7 is a flowchart illustrating operations in a mirroring mode according to an embodiment.

Next, operations in the "mirroring mode" of the aforementioned subroutine S410 will be described with reference to the flowchart in FIG. 7. The processing described below is realized, for example, by the CPU 201 loading programs stored in the flash memory 203 or the like into the RAM 204 and executing those programs. Here, "mirroring mode" refers to a mode in which both the SSD 115 and the HDD 116 are in an active state, and data write requests are made to both of the storage devices.

First, in S701, the CPU 201 determines whether or not a read request has been received from the host-side main CPU 102. If in S701 a read request has been received from the main CPU 102 (Yes), the process moves to S702, where the CPU 201 makes a read access to the SSD 115 and transfers the read data to the host-side main CPU 102, after which the process moves to S705.

On the other hand, if in S701 no read request has been received from the main CPU 102 (No), the process moves to S703, where the CPU 201 determines whether or not a write request has been received from the main CPU 102. If in S703 a write request has been received from the main CPU 102 (Yes), the process moves to S704, where the CPU 201 makes a write access to the SSD 115 and the HDD 116, after which the process moves to S705.

In S705, the CPU 201 determines whether or not a Standby Immediate command, which is issued from the main CPU 102 before storage is powered off, has been received. The process returns to S701 if no Standby Immediate command has been received in S705 (No). On the other hand, if in S705 a Standby Immediate command has been received (Yes), the process moves to S706, where the CPU 201 sends the Standby Immediate command to the SSD 115 and the HDD 116, after which the process ends.

Degeneracy Mode

Figure 15:
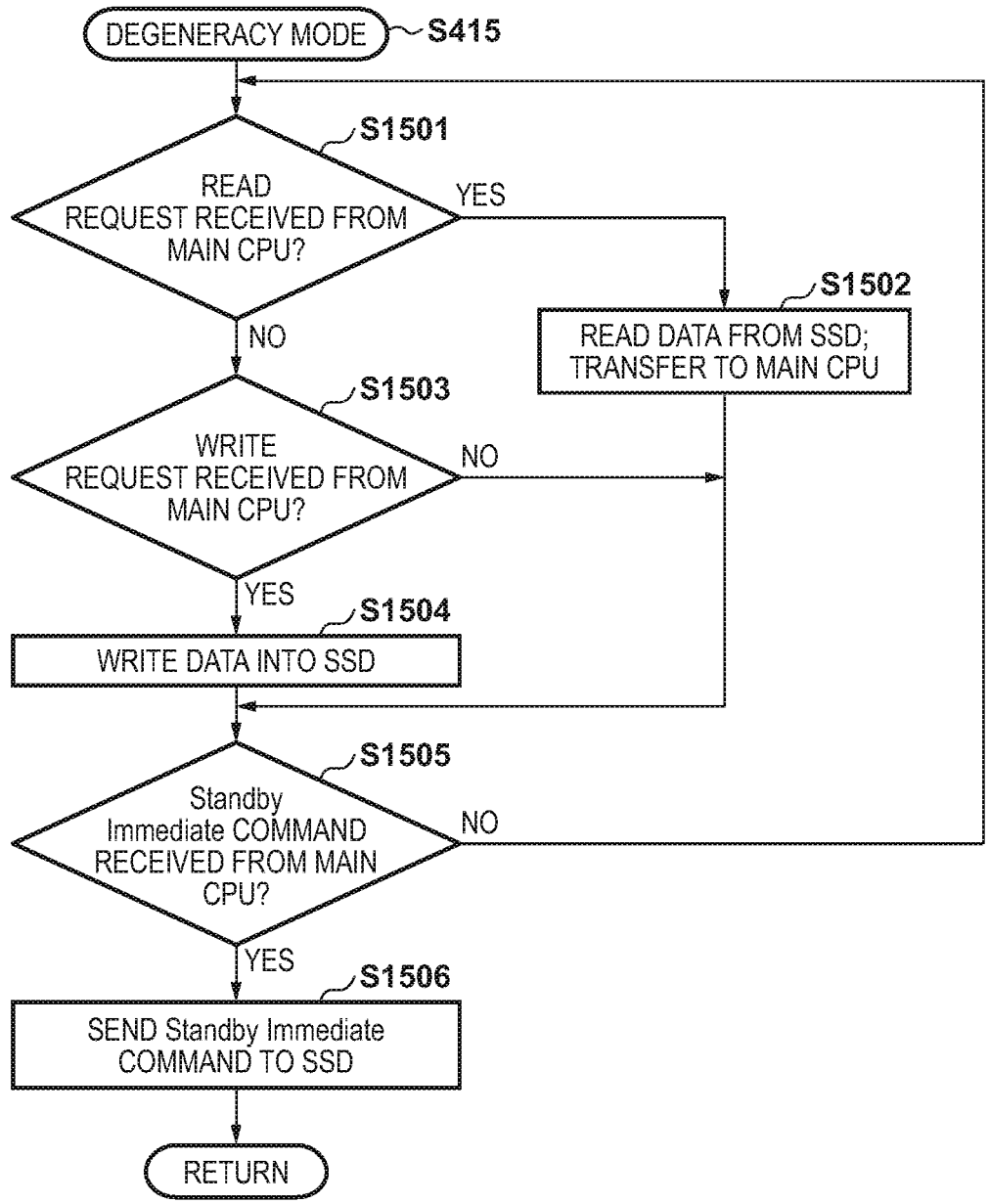
FIG. 15 is a flowchart illustrating operations in a degeneracy mode according to an embodiment.

Next, operations in the "degeneracy mode" of the aforementioned subroutine S415 will be described with reference to the flowchart in FIG. 15. The processing described below is realized, for example, by the CPU 201 loading programs stored in the flash memory 203 or the like into the RAM 204 and executing those programs. Here, the degeneracy mode differs from the mirroring mode, in that while data is written into the SSD 115 and the HDD 116 in the mirroring mode, data is written only to the SSD 115 in the degeneracy mode.

First, in S1501, the CPU 201 determines whether or not a read request has been received from the host-side main CPU 102. If in S1501 a read request has been received from the main CPU 102 (Yes), the process moves to S1502, where the CPU 201 makes a read access to the SSD 115 and transfers the read data to the host-side main CPU 102, after which the process moves to S1505.

On the other hand, if in S1501 no read request has been received from the main CPU 102 (No), the process moves to S1503, where the CPU 201 determines whether or not a write request has been received from the main CPU 102. If in S1503 a write request has been received from the main CPU 102 (Yes), the process moves to S1504, where the CPU 201 makes a write access to the SSD 115, after which the process moves to S1505. On the other hand, if in S1503 no write request has been received from the main CPU 102 (No), the process moves directly to S1505.

In S1505, the CPU 201 determines whether or not the Standby Immediate command, which is issued from the main CPU 102 before storage is powered off, has been received. The process returns to S1501 if no Standby Immediate command has been received in S1505 (No). On the other hand, if in S1505 a Standby Immediate command has been received (Yes), the process moves to S1506, where the CPU 201 sends the Standby Immediate command to the SSD 115, after which the process ends. In this manner, the mirroring mode and the degeneracy mode differ in terms of the processes of S704 and S1504.

As described thus far, the storage control apparatus (storage device control unit) according to this embodiment can be connected to a higher level apparatus and a plurality of storage devices, and receives, from the higher level apparatus, a request to write into one of the plurality of storage devices. Here, if a storage device, among the plurality of storage devices, that has been specified as the access destination for the write request is not yet active, the storage control apparatus suspends the data corresponding to the write request, and writes the suspended data corresponding to the write request into the storage device once the storage device specified as the access destination is in a ready state. Additionally, according to this embodiment, mirroring is carried out by controlling at least one SSD 115 and at least one HDD 116, which are included in the plurality of storage devices, in tandem. Providing the single mode and the recovery mode in the mirroring control makes it possible to make both reads and writes even when not all of the storage devices are in the ready state. This makes it possible to shorten the startup time when the power source is turned on, the time required to return from a power saving mode, and so on. Thus according to this embodiment, it is possible to provide a system that favorably handles a situation where, when a plurality of storage devices are controlled in tandem, a storage device in the process of starting up is accessed by a higher level apparatus.

Second Embodiment

A second embodiment of the invention will be described below. Although the foregoing first embodiment describes suspended write data being read from the first storage device that has entered the ready state (the SSD 115, in the first embodiment), and that data then being written into the HDD 116, the second embodiment changes this part.

Configuration of Storage Device Control Unit

Figure 9:
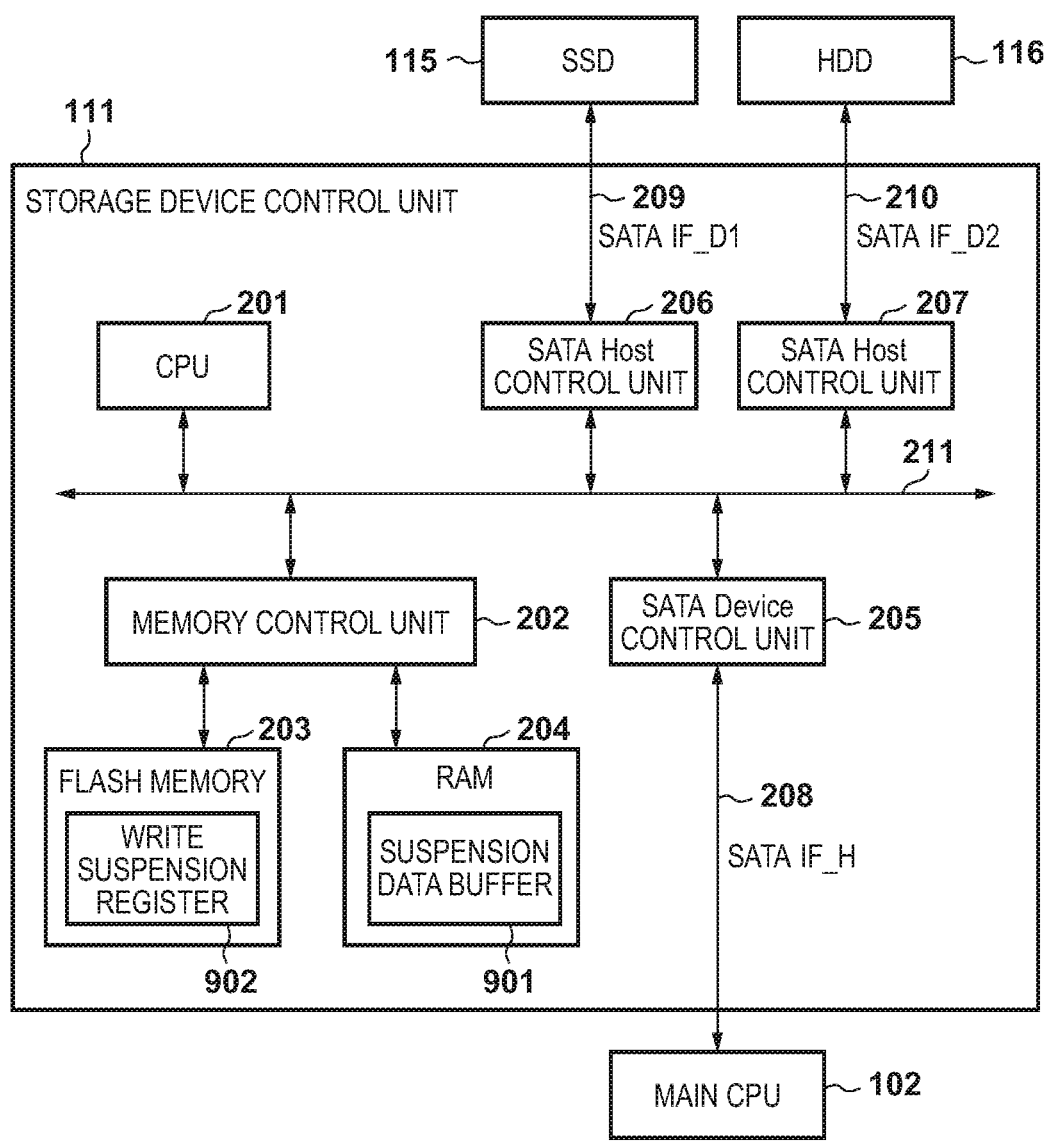
FIG. 9 is a block diagram illustrating the internal configuration of the storage device control unit 111 according to an embodiment.

An example of the internal configuration of the storage device control unit 111 according to this embodiment will be described with reference to FIG. 9. In FIG. 9, constituent elements identical to those in the first embodiment are given identical reference numerals, and descriptions thereof will be omitted. The characteristic parts of this embodiment are that a suspension data buffer 901 is provided in the RAM 204, and the configuration of a write suspension register 902 in the flash memory 203 has been changed. First, the suspension data buffer hold suspended write data.

Figure 10:
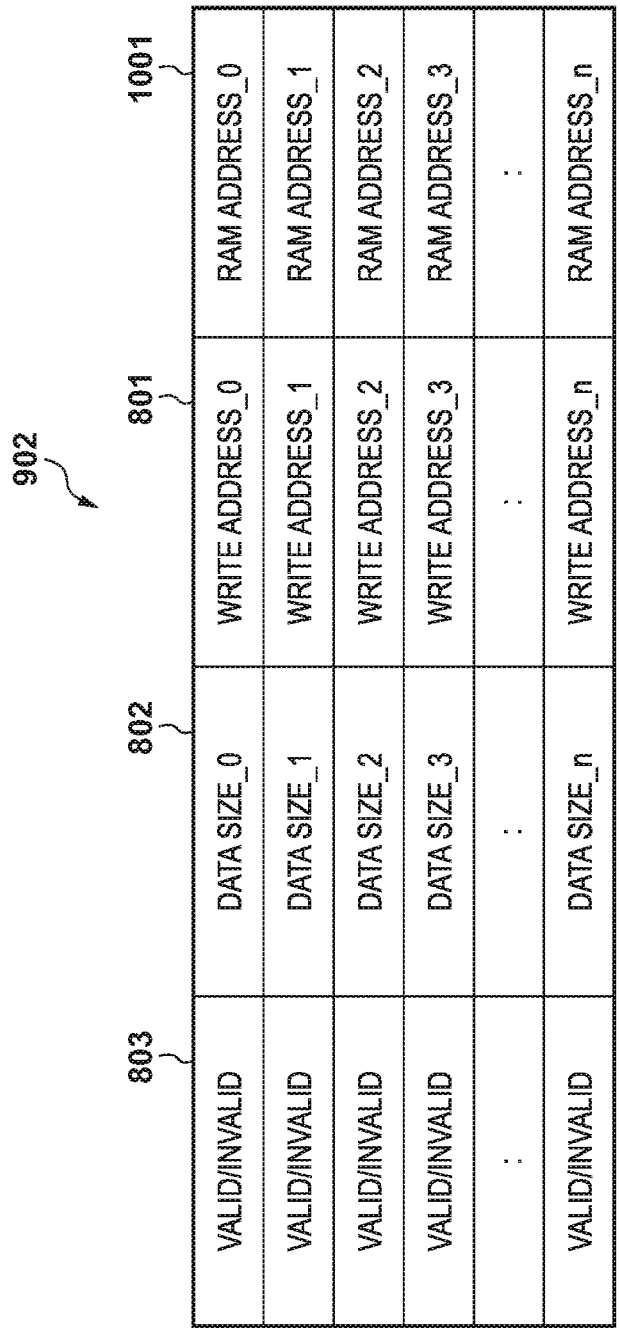
FIG. 10 is a schematic diagram illustrating the configuration of the write suspension register according to an embodiment.

FIG. 10 illustrates the configuration of the write suspension register 902. In FIG. 10, elements identical to those described in the first embodiment and illustrated in FIG. 8 are given identical reference numerals, and descriptions thereof will be omitted. 1001 indicates a RAM address holding region, which stores address information indicating where data is held in the suspension data buffer provided in the RAM 204.

Single Mode

A processing sequence by the storage device control unit 111 according to this embodiment will be described below. The main flowchart is exactly the same as FIG. 4, described in the foregoing first embodiment, and will thus not be mentioned here. The "single mode" in subroutine S407 and the "recovery mode" in subroutine S409 have been partially changed.

Figure 11:
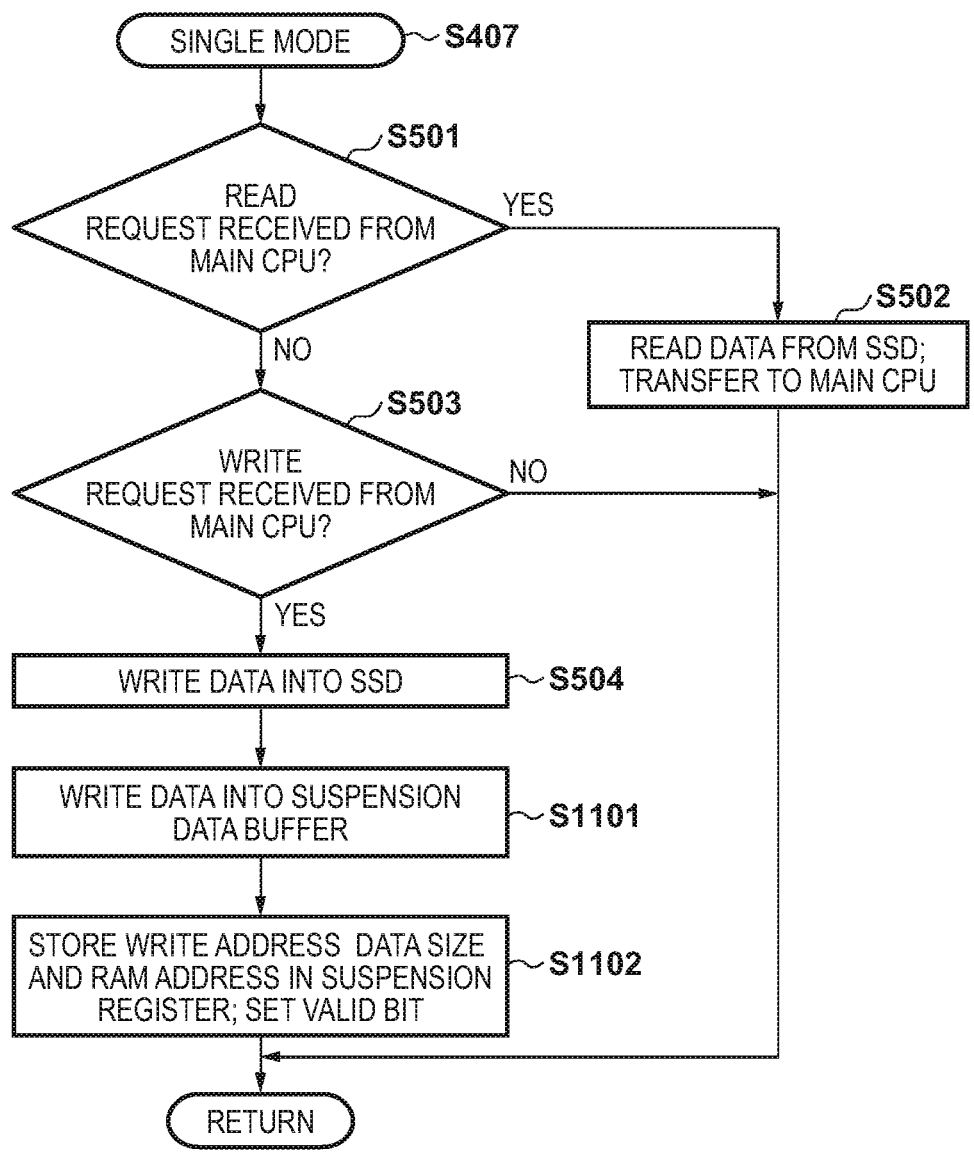
FIG. 11 is a flowchart illustrating operations in the single mode according to an embodiment.

First, the processing sequence in the "single mode" of subroutine S407 according to this embodiment will be described with reference to FIG. 11. This is realized, for example, by the CPU 201 loading programs stored in the flash memory 203 or the like into the RAM 204 and executing those programs. The operations up until S504, i.e., making a write access to the SSD 115 for which a notification of RegDH (DRDY=1) has been received, are the same as in the flowchart of FIG. 5 and described in the first embodiment, and will therefore not be mentioned here.

Following S504, in S1101, the CPU 201 writes the right data into the suspension data buffer 901. Then, in S1102, the CPU 201 searches the write suspension register 220 in the flash memory 203 for an entry in which the valid bit 803 is clear, i.e., is "0". Furthermore, the CPU 201 writes the write address, the data size, and the RAM address in the suspension data buffer 901 into the entry that has been found, sets the valid bit 803 to "1", and returns to the main routine.

Recovery Mode

Figure 12:
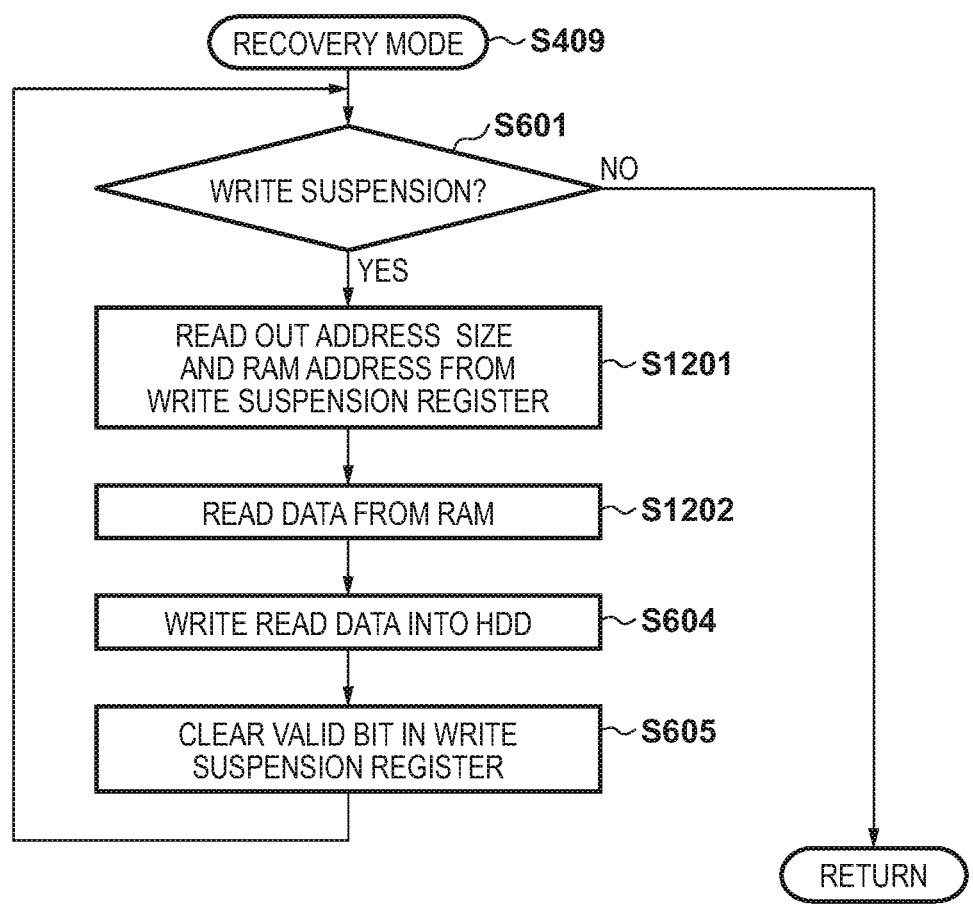
FIG. 12 is a flowchart illustrating operations in the recovery mode according to an embodiment.

Next, the processing sequence in the "recovery mode" of subroutine S409 according to this embodiment will be described with reference to FIG. 12. This is realized, for example, by the CPU 201 loading programs stored in the flash memory 203 or the like into the RAM 204 and executing those programs. Steps having the same numbers as in the first embodiment are the same operations as in the first embodiment, and will therefore not be mentioned here.

The process moves to S1201 if there is an entry, in the write suspension register 220 within the flash memory 203, where the valid bit 803 is set to "1" in S601. In S1201, the CPU 201 reads out the write address 801, the data size 802, and the RAM address from the same entry. Then, in S1202, the CPU 201 reads data from the RAM 204 on the basis of the RAM address information and the data size information read out in S1201, after which the process moves to S604. The processing that follows thereafter is the same as in the flowchart of FIG. 6, described in the first embodiment, and will therefore not be mentioned here.

According to this embodiment as described thus far, if any one of the plurality of storage devices is not in the ready state, data corresponding to a write request to that storage device is stored in the RAM 204 provided in the storage device control unit 111. Accordingly, it is not necessary to read out the write data suspended in the recovery mode from the SSD 115, which eliminates competition for read access from the host-side main CPU 102. This makes it possible to process the data more quickly.

Third Embodiment

A third embodiment of the invention will be described below. Although the first embodiment describes giving priority to writing all the suspended write data into the HDD 116 when a write into the HDD 116 has been suspended in the "recovery mode" of subroutine S409, this embodiment changes that part. Aside from the operations in this "recovery mode", this embodiment is the same as the first embodiment, including the configuration, and thus descriptions of the identical parts will be omitted.

Recovery Mode

Figure 13:
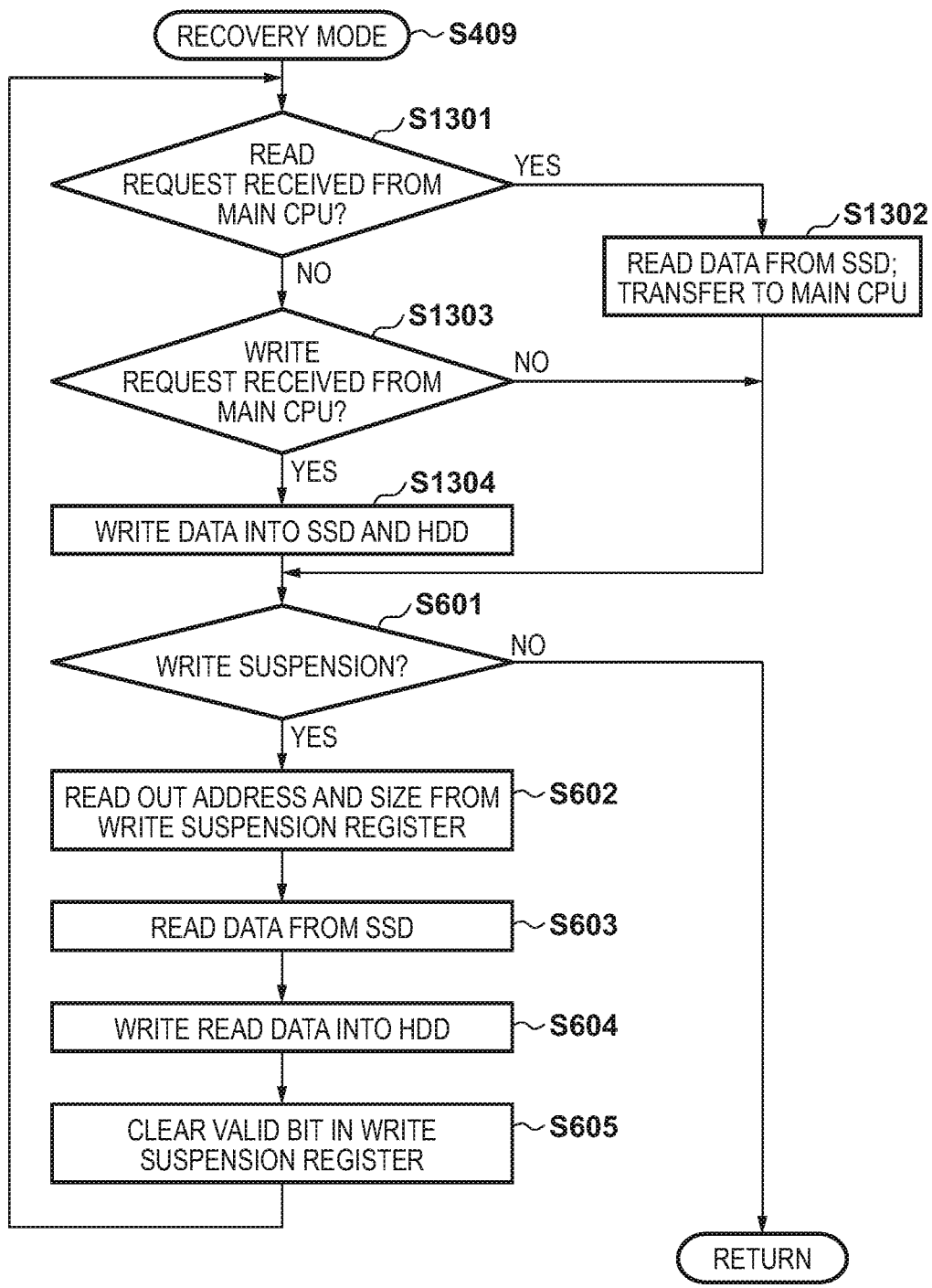
FIG. 13 is a flowchart illustrating operations in the recovery mode according to an embodiment.

The processing sequence in the "recovery mode" of subroutine S409 according to this embodiment will be described with reference to FIG. 13. This is realized, for example, by the CPU 201 loading programs stored in the flash memory 203 or the like into the RAM 204 and executing those programs. Compared to the first embodiment, the characteristic operation is that an access request from the host-side main CPU 102 (read request or write request) is prioritized.

First, in S1301, the CPU 201 determines whether or not a read request has been received from the host-side main CPU 102. If in S1301 a read request has been received from the main CPU 102 (Yes), the process moves to S1302, where the CPU 201 makes a read access to the SSD 115 and transfers the read data to the host-side main CPU 102. On the other hand, if in S1301 no read request has been received from the main CPU 102 (No), in S1303, the CPU 201 determines whether or not a write request has been received from the main CPU 102.

If in S1303 a write request has been received from the main CPU 102 (Yes), in S1304, the CPU 201 makes a write access to the SSD 115 and the HDD 116, after which the process moves to S601. On the other hand, if in S1303 no write request has been received from the main CPU 102 (No), the process moves to S601. The operations from S601 to S605 are the same as in the first embodiment, and will therefore not be mentioned here. After S605, the process returns to S1301, where the CPU 201 determines whether or not a read request has been received from the main CPU 102.

According to this embodiment as described thus far, processing is carried out to prioritize an access request, namely a read request or a write request, from the host-side main CPU 102 over processing the write data suspended in the recovery mode. This further shortens the startup time and the return time of the information processing apparatus.

Fourth Embodiment

A fourth embodiment of the invention will be described below. This embodiment considers a case where an unanticipated power failure occurs during the single mode or the recovery mode of the first embodiment, and the power source has been turned on in a state where a suspension of a write to the HDD 116 remains. Steps that have the same operations as in the first embodiment are given identical reference numerals, and will not be mentioned here.

Processing Sequence of Storage Device Control Unit

Figure 14A:
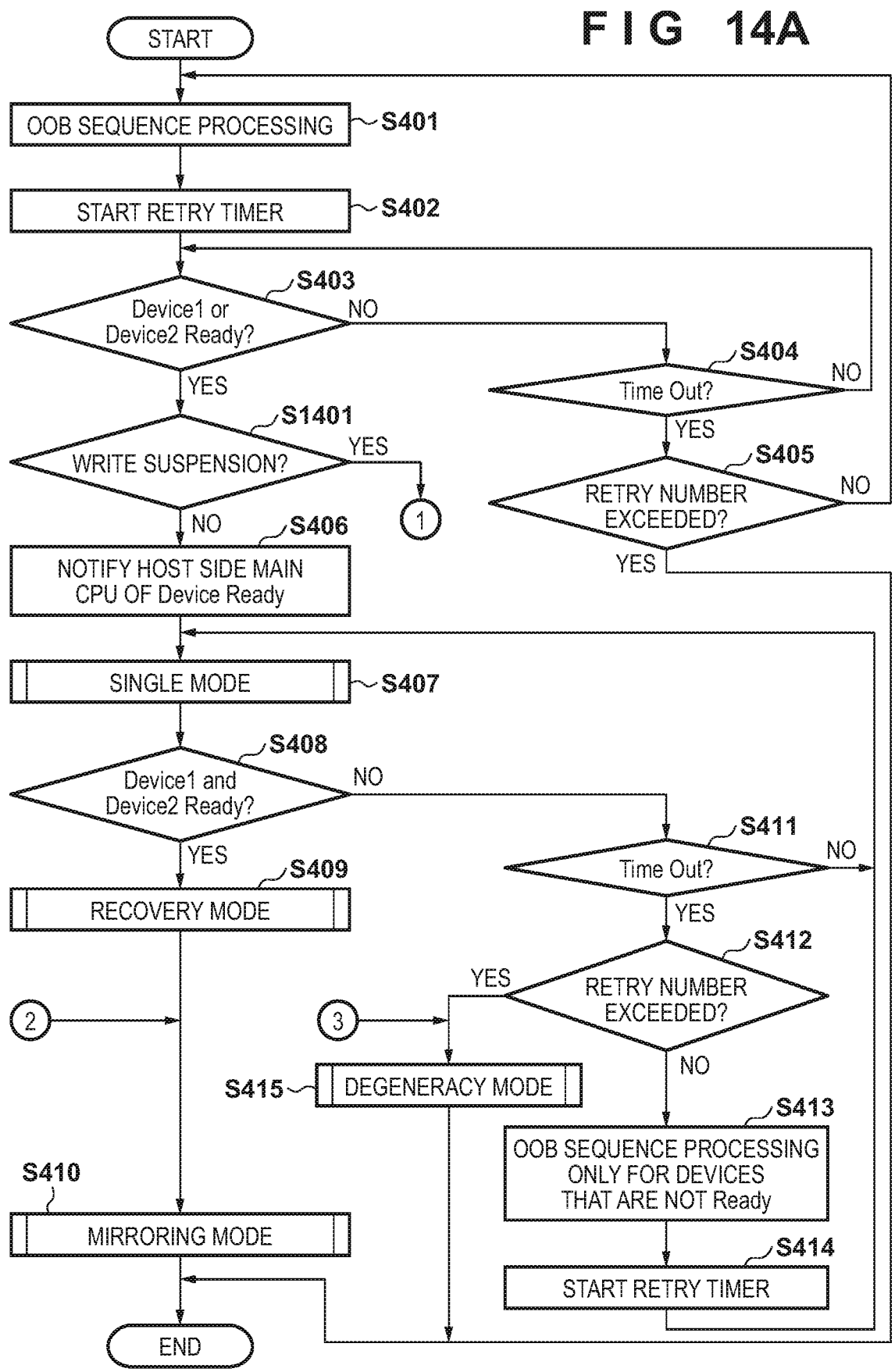
FIGS. 14A and 14B are flowcharts illustrating operations performed by the storage device control unit according to an embodiment.
Figure 14B:
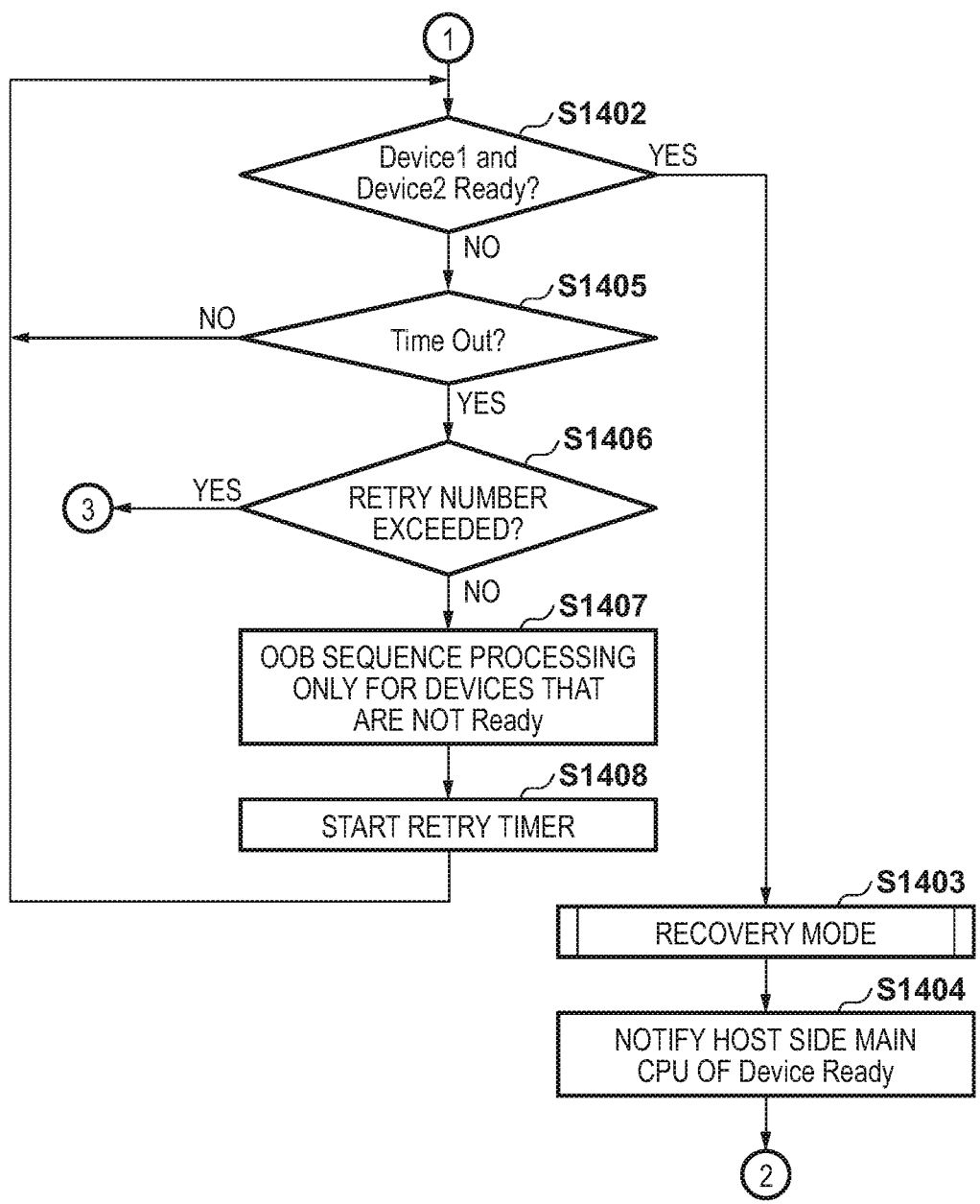

A processing sequence of operations by the storage device control unit 111 according to this embodiment will be described with reference to FIGS. 14A and 14B. The processing described below is realized, for example, by the CPU 201 loading programs stored in the flash memory 203 or the like into the RAM 204 and executing those programs. In FIGS. 14A and 14B, steps identical to those described in the first embodiment and illustrated in the flowchart of FIG. 4 are given identical reference numerals, and descriptions thereof will be omitted.

The process moves to S1401 if a notification of the RegDH (DRDY=1) has been received from the SSD 115 or the HDD 116 in S403. In S1401, the CPU 201 determines whether or not there is an entry, in the write suspension register 220 in the flash memory 203, where the valid bit 803 is set to "1". If in S1401 there is no entry in which the valid bit 803 is set to "1" (No), the process moves to S406, and the same operations as those described in the first embodiment and illustrated in the flowchart of FIG. 4 are then carried out.

On the other hand, if in S1401 there is an entry in which the valid bit 803 is set to "1" (Yes), the process moves to S1402. In S1402, the CPU 201 waits for a notification of the RegDH (DRDY=1) from the storage device from which a notification was not received in S403, and determines whether or not a notification of the RegDH (DRDY=1) has been received from all storage devices. If it is determined in S1402 that a notification of the RegDH (DRDY=1) has not been received from all storage devices (No), the process moves to S1405, where the CPU 201 checks the retry timer and determines whether or not the time required for a retry has passed. If in S1405 it is determined that the time required for a retry has not passed (No), the process returns to S1402, whereas if it is determined that the time required for a retry has passed (Yes), the process moves to S1406.

In S1406, the CPU 201 checks a retry number and determines whether or not the retry number exceeds a prescribed number. If in S1406 the retry number does not exceed the prescribed number (No), the process moves to S1407, where the CPU 201 carries out the OOB sequence processing for a device not in the ready state. Then, in S1408, the CPU 201 starts the retry timer and returns the process to S1402.

On the other hand, if in S1406 the retry number exceeds the prescribed number (Yes), it is conceivable that one of the storage devices has malfunctioned or the like, and thus the process moves to the degeneracy mode subroutine S415. On the other hand, if in S1402 a notification of the RegDH (DRDY=1) has been received from all storage devices (Yes), the process moves to a recovery mode subroutine S1403. Operations in the "recovery mode" of subroutine S1403 are the same as in the "recovery mode" of subroutine S409 in the first embodiment, and will therefore not be mentioned here. After the recovery mode ends, in S1404, the CPU 201 notifies the host-side main CPU 102 of the RegDH (DRDY=1). The process then moves to the "mirroring mode" of the subroutine S410.

According to this embodiment as described thus far, even if an unintended power failure arises before the recovery mode is complete, it is determined whether or not there is a write suspension at the next startup, and recovery is carried out first if such a write suspension remains. As such, data consistency can be maintained among the plurality of storage devices even if an unintended power failure has occurred.

Fifth Embodiment

A fifth embodiment of the invention will be described below. The first to fourth embodiments describe operations in a mirroring mode, where the same data is stored in a plurality of storage devices. However, the invention can also be applied in Just a Bunch of Disks (JBOD), which consolidates a plurality of disks into high capacity storage, and this configuration will be described in this embodiment.

JBOD

Figure 16:
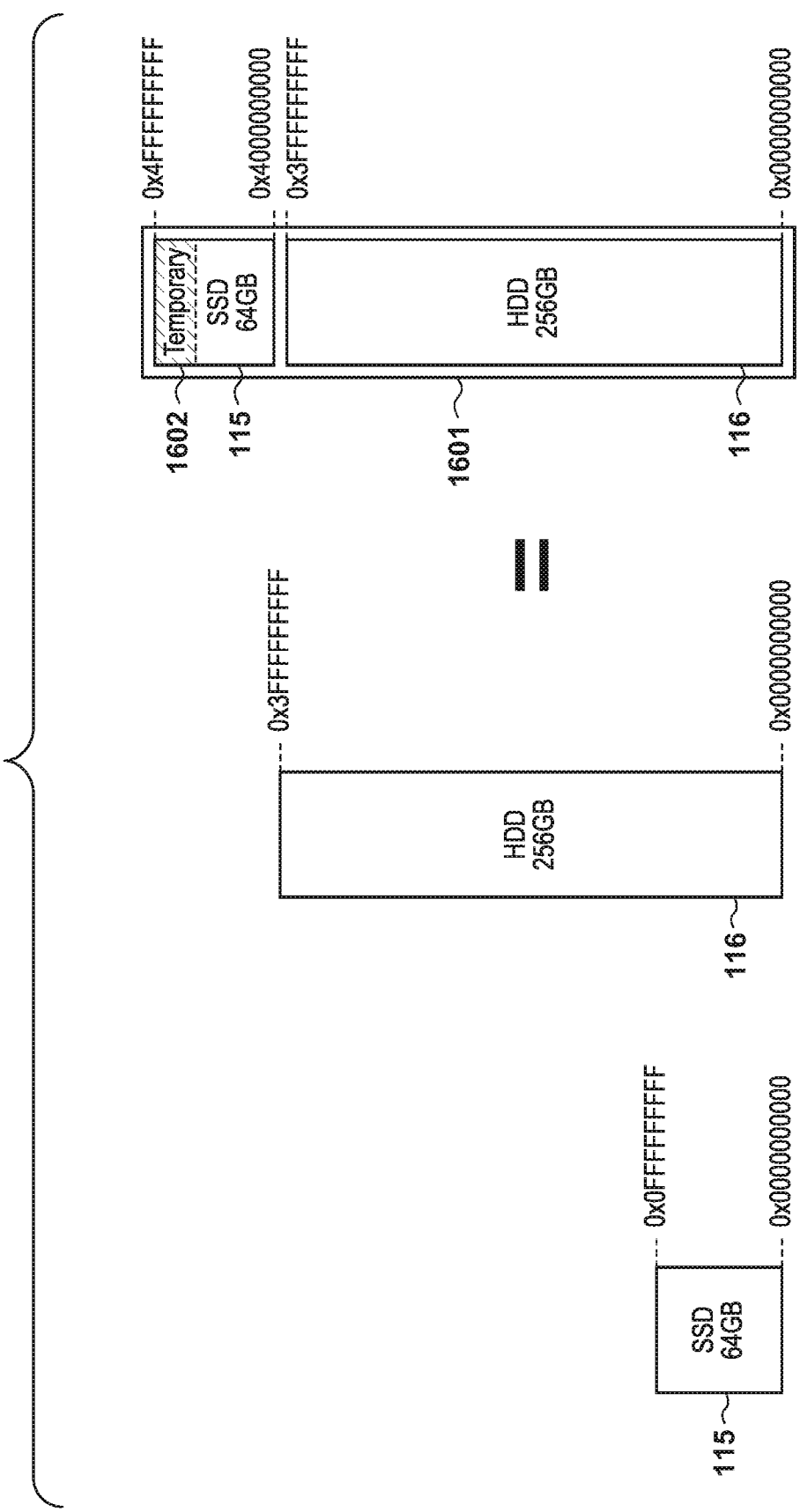
FIG. 16 is a diagram illustrating an overview of JBOD according to an embodiment.

An overview of JBOD will be given with reference to FIG. 16. In FIGS. 16, 115 and 116 indicates storage devices, and in this embodiment, it is assumed that 115 is a 64-GB SSD and 116 is a 256-GB HDD.

The storage device control unit 111 of the printing apparatus 100 virtually links the SSD 115 and the HDD 116, so that those drives are handled as a single 320-GB storage device 1601 from the standpoint of the main CPU 102 of the main control unit 101 in the printing apparatus 100. However, a temporary region 1602 for temporarily storing write data is secured in advance.

The internal configuration of the storage device control unit 111 is the same as in the first embodiment, with the exception of the configuration of the write suspension register 220 and the flash memory 203. An example of the configuration of the write suspension register 220 according to this embodiment will be described here with reference to FIG. 21. In FIG. 21, elements identical to those described in the first embodiment and illustrated in FIG. 8 are given identical reference numerals, and descriptions thereof will be omitted. 2101 indicates a temporary address holding region, which stores address information indicating storage locations in the temporary region 1602.

Processing Sequence of Storage Device Control Unit

Figure 17A:
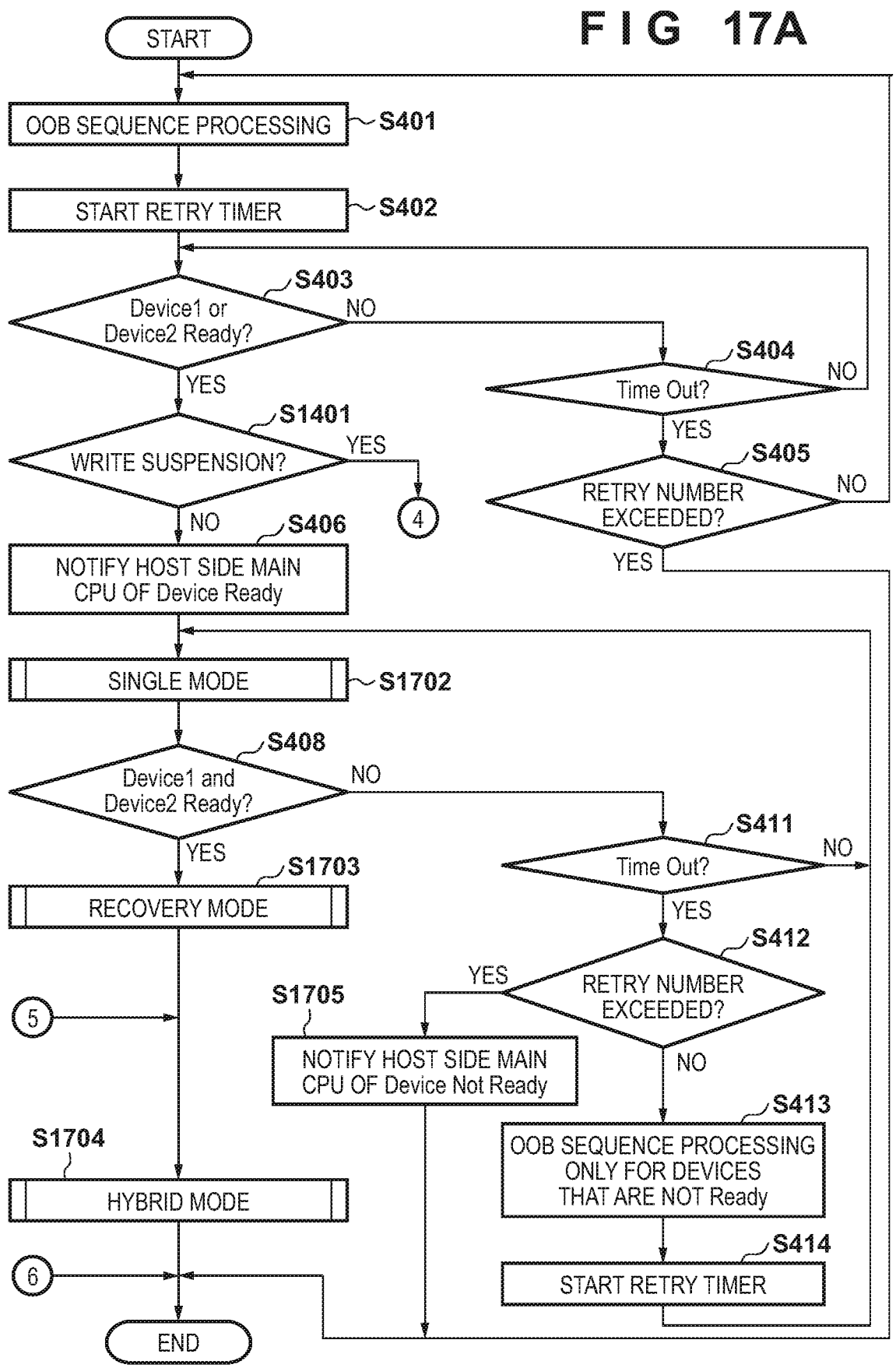
FIGS. 17A and 17B are flowcharts illustrating operations performed by the storage device control unit according to an embodiment.
Figure 17B:
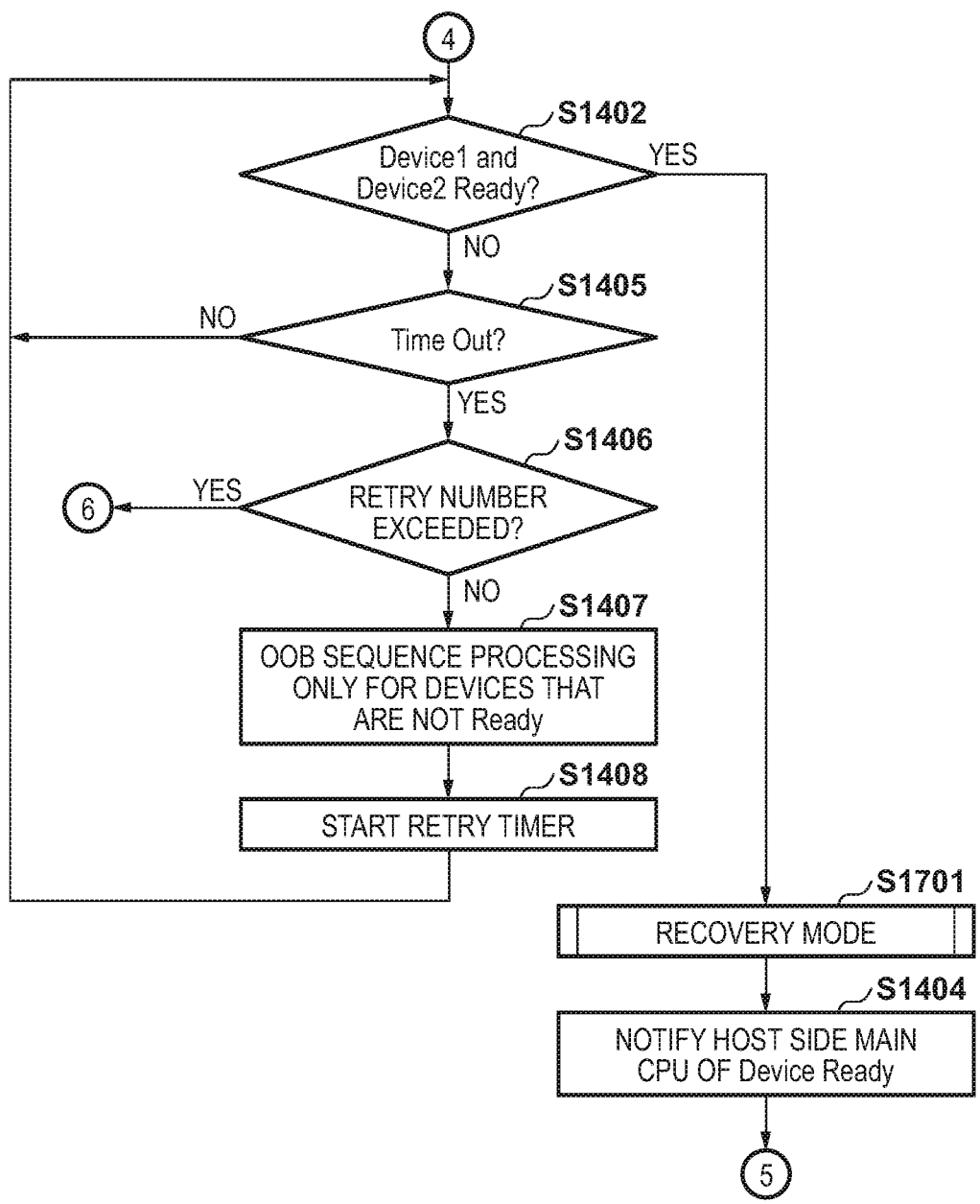

A processing sequence of operations by the storage device control unit 111 according to this embodiment will be described next with reference to FIGS. 17A and 17B. The processing described below is realized, for example, by the CPU 201 loading programs stored in the flash memory 203 or the like into the RAM 204 and executing those programs. In FIGS. 17A and 17B, steps identical to those described in the fourth embodiment and illustrated in the flowcharts of FIGS. 14A and 14B are given identical reference numerals, and descriptions thereof will be omitted.

In the fourth embodiment, if the retry number exceeds the prescribed number in S412 (Yes), the process moves to the "degeneracy mode" in the subroutine S415. However, in this embodiment, the JBOD will cease to function, and thus a notification of RegDH (DRDY=0), i.e., Device Not Ready, is made to the host-side main CPU 102. The "single mode" in subroutine S1702 and the "recovery mode" in subroutines S1701 and S1703 differ from those in the above-described fourth embodiment. Additionally, the "mirroring mode" subroutine is changed to a "hybrid mode" subroutine S1704. These will be described in order below.

Single Mode

Figure 18:
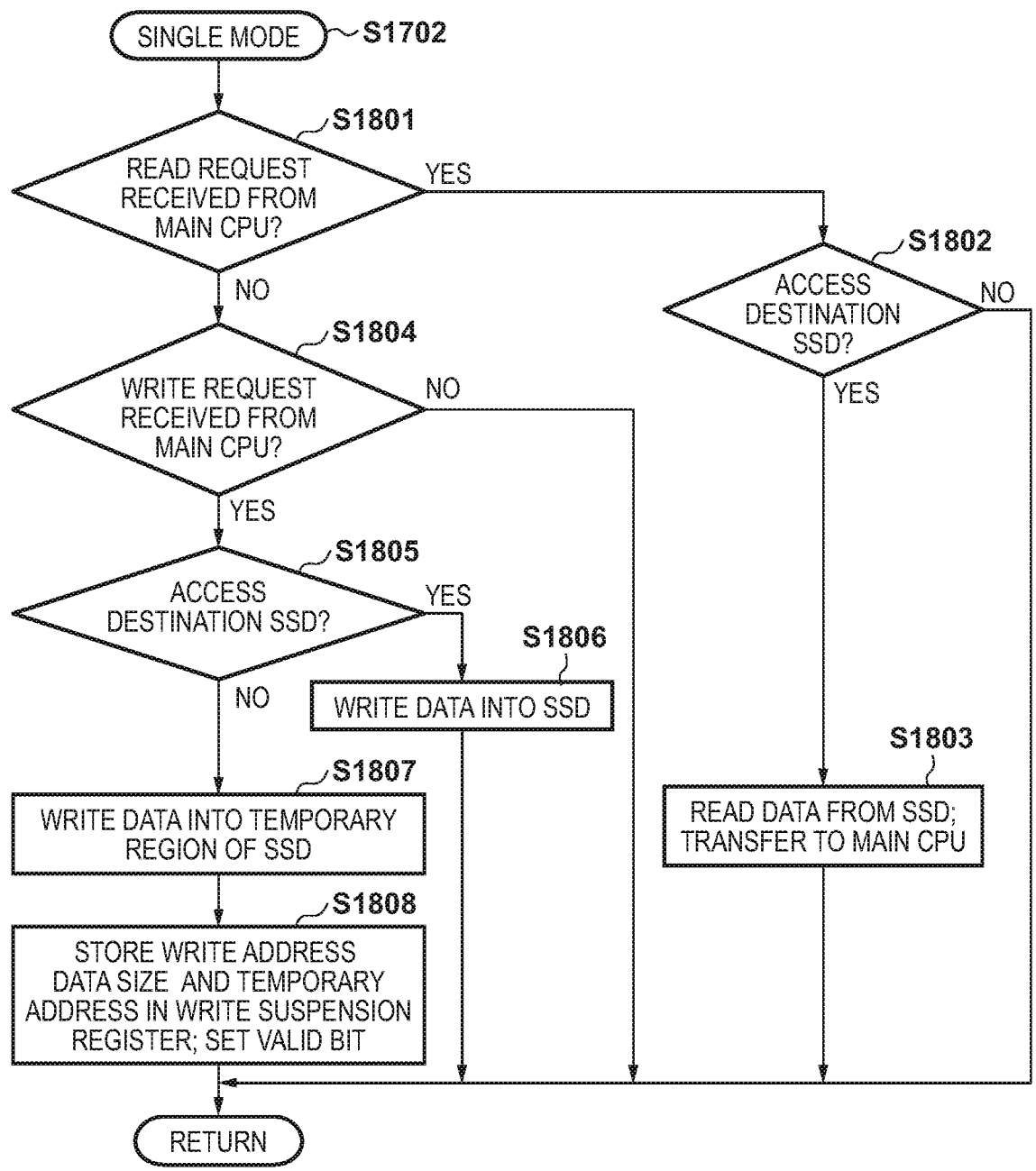
FIG. 18 is a flowchart illustrating operations in the single mode according to an embodiment.

A processing sequence of operations in the "single mode" in subroutine S1702 will be described next with reference to FIG. 18. This is realized, for example, by the CPU 201 loading programs stored in the flash memory 203 or the like into the RAM 204 and executing those programs.

First, in S1801, the CPU 201 determines whether or not a read request has been received from the host-side main CPU 102. If a read request has been received from the main CPU 102 in S1801 (Yes), the process moves to S1802, where the CPU 201 determines whether or not the access destination is the storage device from which a notification of the RegDH (DRDY=1) has been received (the SSD 115, here). If it is determined in S1802 that the access destination is the SSD 115 (Yes), the process moves to S1803, where the CPU 201 makes a read access to the SSD 115 and transfers the read data to the host-side main CPU 102. The process then returns to the main routine. If it is determined in S1802 that the access destination is not the SSD 115 (No), the process returns directly to the main routine.

On the other hand, if in S1801 no read request has been received from the main CPU 102 (No), the process moves to S1804, where the CPU 201 determines whether or not a write request has been received from the main CPU 102. If a write request is received from the main CPU 102 in S1804 (Yes), the process moves to S1805, where the CPU 201 determines whether or not the access destination is the storage device from which a notification of the RegDH (DRDY=1) has been received. If it is determined in S1805 that the access destination is the SSD 115 (Yes), the process moves to S1806, where the CPU 201 makes a write access to the SSD 115, and returns to the main routine.

On the other hand, if it is determined S1805 that the access destination is not the SSD 115 (No), the process moves to S1807, where the CPU 201 writes data into the temporary region 1602 of the SSD 115. Then, in S1808, the CPU 201 searches the write suspension register 220 in the flash memory 203 for an entry in which the valid bit 803 is clear, i.e., is "0". Furthermore, the CPU 201 writes the write address, the data size, and, as a temporary address, the address written into the temporary region 1602 of the SSD 115 in S1807, into the entry that has been found, and sets the valid bit 803 to "1". The process then returns to the main routine.

Recovery Mode

Figure 19:
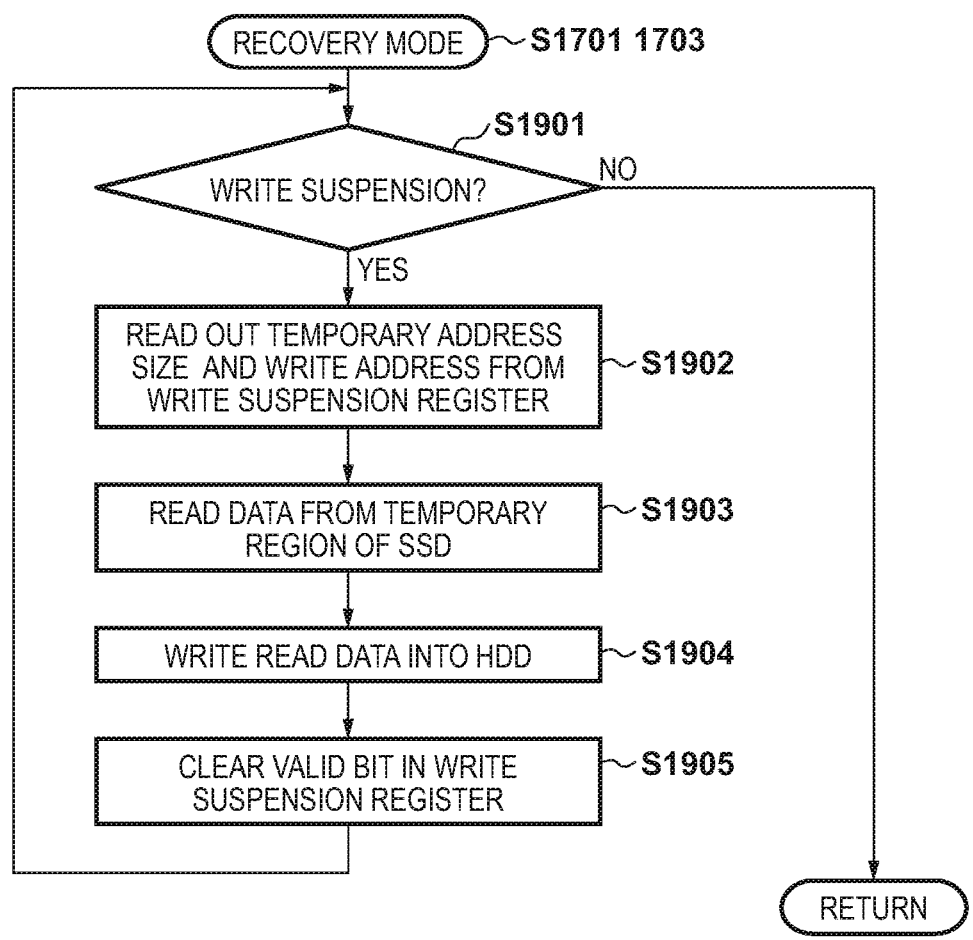
FIG. 19 is a flowchart illustrating operations in the recovery mode according to an embodiment.

A processing sequence of operations in the "recovery mode" in subroutines S1701 and 1703 will be described next with reference to FIG. 19. This is realized, for example, by the CPU 201 loading programs stored in the flash memory 203 or the like into the RAM 204 and executing those programs.

First, in S1901, the CPU 201 determines whether or not there is an entry, in the write suspension register 220 in the flash memory 203, where the valid bit 803 is set to "1". If there is no entry where the valid bit 803 is set to "1" (No), the process returns to the main routine.

On the other hand, if there is an entry where the valid bit 803 is set to "1" (Yes), the process moves to S1902, where the CPU 201 reads out the write address 801, the data size 802, and the temporary address 2101 in that entry. Then, in S1903, the CPU 201 reads data from the SSD 115 on the basis of the temporary address information and data size information that has been read out. In S1904, the CPU 201 writes the read data into the HDD 116 on the basis of the write address information read out in S1902. Furthermore, in S1905, once the write has been completed, the CPU 201 clears the valid bit of the register read out in S1902 to "0", and returns the process to S1901.

Hybrid Mode

Figure 20:
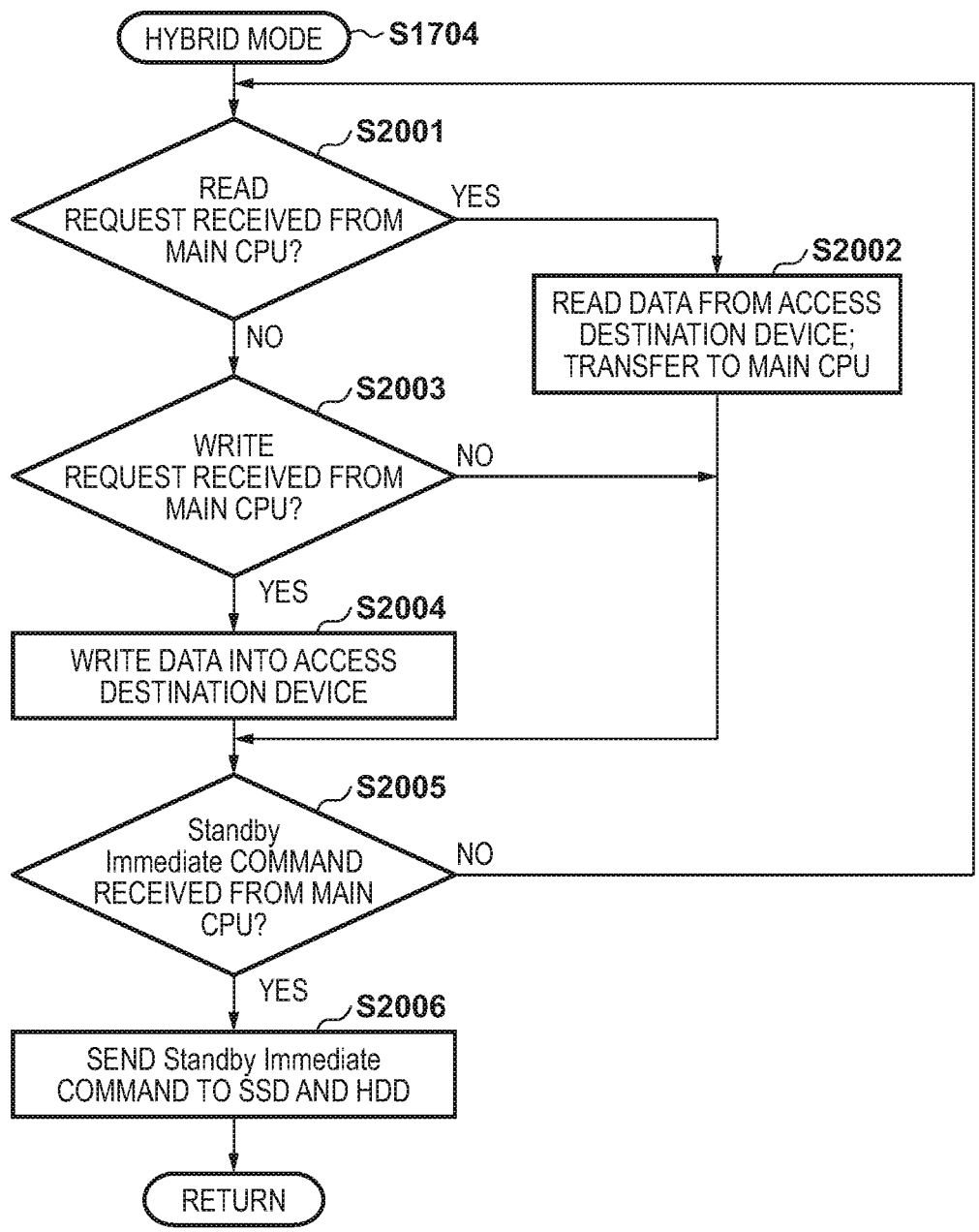
FIG. 20 is a flowchart illustrating operations in a hybrid mode according to an embodiment.

A processing sequence of operations in the "hybrid mode" in subroutine S1704 will be described next with reference to FIG. 20. This is realized, for example, by the CPU 201 loading programs stored in the flash memory 203 or the like into the RAM 204 and executing those programs. Here, the hybrid mode differs from the mirroring modes in the first to fourth embodiments, in that write accesses or read accesses are carried out only for either the SSD 115 or the HDD 116, e.g., only for the storage device serving as the access destination.

First, in S2001, the CPU 201 determines whether or not a read request has been received from the host-side main CPU 102. If in S2001 a read request has been received from the main CPU 102 (Yes), the process moves to S2002, where the CPU 201 makes a read access to the device serving as the access destination and transfers the read data to the host-side main CPU 102, after which the process moves to S2005.

On the other hand, if in S2001 no read request has been received from the main CPU 102 (No), the process moves to S2003, where the CPU 201 determines whether or not a write request has been received from the main CPU 102. If in S2003 a write request has been received from the main CPU 102 (Yes), the process moves to S2004, where the CPU 201 makes a write access to the device serving as the access destination. Then, in S2005, the CPU 201 determines whether or not a Standby Immediate command, which is issued from the main CPU 102 before storage is powered off, has been received. The process returns to S2001 if no Standby Immediate command has been received in S2005 (No). On the other hand, if in S2005 a Standby Immediate command has been received (Yes), the process moves to S2206, where the CPU 201 sends the Standby Immediate command to the SSD 115 and the HDD 116, after which the process returns to the main routine.

According to this embodiment as described thus far, JBOD control is provided with the single mode and the recovery mode. Accordingly, even if not all of the storage devices are in a ready state, writes can be made to the storage devices not in a ready state, in addition to reads/writes from/to storage devices in a ready state. This makes it possible to shorten the startup time when the power source is turned on, the time required to return from a power saving mode, and so on.

Note that the invention is not limited to the aforementioned embodiment, and many variations can be carried out thereon. For example, if a write request is made to an address holding suspended data for which the access destination of the data corresponding to the write request is already held, control may be carried out to overwrite the suspended data already being held. This makes it possible to eliminate unnecessary recovery processes, and shorten the startup time, return time, and so on.

Other Embodiments

Embodiment(s) of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-185317 filed on Sep. 26, 2017, which is hereby incorporated by reference herein in its entirety.

What is claimed is:

1. An information processing apparatus including a host device, a non-volatile first storage device, and a non-volatile second storage device, the information processing apparatus comprising:
a controller that transmits, to the host device, a ready command indicating a transition from a non-writable state to a writable state by accepting the ready command from at least one of the first storage device and the second storage device, the controller having one or more processors that execute instructions stored in one or more memories,
wherein the controller
accepts the ready command from the first storage device based on a transition from a state in which power is not supplied to the first storage device and the second storage device to a state in which power is supplied to the first storage device and the second storage device,
causes, upon accepting a write request from the host device in a first state where the ready command has been accepted from the first storage device and the ready command has not been accepted from the second storage device, the first storage device to execute a write process of data based on the write request,
stores, in the one or more memories, execution information corresponding to the write process executed by the first storage device, and
causes the second storage device to execute the write process of data based on the execution information stored in the one or more memories when transitioning from the first state to a second state where the ready command has been accepted from the first storage device and the second storage device.

2. The information processing apparatus according to claim 1,
wherein the execution information includes a write address of the first storage device and a data size which was written in the write process.

3. The information processing apparatus according to claim 2,
wherein the controller reads out the data from the first storage device based on the execution information and causes the second storage device to store the data.

4. The information processing apparatus according to claim 1, wherein the controller includes another memory different from the memory, the another memory stores data to be stored in the write process executed by the first storage device, and the controller reads out the data from the another memory and causes the second storage device to store the data.

5. The information processing apparatus according to claim 1, wherein the host device includes a main CPU of the information processing apparatus.

6. The information processing apparatus according to claim 1, wherein the controller accepts the write request before accepting the ready command from the second storage device and after accepting the ready command from the first storage device.

7. The information processing apparatus according to claim 1, wherein a startup speed of the first storage device when transitioning from a state where power is not supplied to a state where power is supplied is faster than that of the second storage device.

8. The information processing apparatus according to claim 1, wherein the first storage device is a nonvolatile semiconductor storage device, and, the second storage device is a nonvolatile magnetic storage device.

9. The information processing apparatus according to claim 8, wherein the first storage device is an SSD, and, the second storage device is an HDD.

10. The information processing apparatus according to claim 1, wherein the controller causes the first storage device and the second storage device to execute a write process of data based on the write request upon accepting the write request from the host device in a case where the ready command has been accepted from the first storage device and the second storage device.

11. The information processing apparatus according to claim 10, wherein the controller performs the mirror control in between the first storage device and the second storage device upon accepting the ready command from the first storage device and the second storage device.

12. The information processing apparatus according to claim 1, wherein in a case where causing the second storage device to execute the write process of data based on the execution information stored in the memory, the controller performs, upon accepting another request different form the write request from the host device, a process based on the other request in advance.

13. The information processing apparatus according to claim 1, wherein the controller performs a degeneracy control that the write process is executed in the first storage device, the write process is not executed in the second storage device and the execution information is not stored in the one ore memory in a case where a predetermined time has elapsed in a state where the ready command has not been accepted from the second storage device in the first state.

14. The information processing apparatus according to claim 1, wherein the execution information is a write address and a write data size of the write process to be executed by the first storage device.

15. The information processing apparatus according to claim 1, wherein the controller deletes the execution information stored in the one or more memory after causing the second storage device to execute the write process of the data in the second state.

* * * * *